(12) United States Patent
Mimassi

(10) Patent No.: US 11,010,741 B1
(45) Date of Patent: May 18, 2021

(54) SYSTEM AND METHOD FOR THE AUTOMATIC CONFIGURATION OF DEVICES BY REMOTE COMMUNICATION WITH A SERVER

(71) Applicant: RockSpoon, Inc.

(72) Inventor: Nagib Georges Mimassi, Palo Alto, CA (US)

(73) Assignee: ROCKSPOON, INC., San Jose, CA (US)

( * ) Notice: Subject to any disclaimer, the term of this patent is extended or adjusted under 35 U.S.C. 154(b) by 0 days.

(21) Appl. No.: 17/153,320

(22) Filed: Jan. 20, 2021

Related U.S. Application Data

(60) Provisional application No. 63/119,748, filed on Dec. 1, 2020.

(51) Int. Cl.
*G06Q 20/20* (2012.01)
*H04L 12/24* (2006.01)
*H04L 29/08* (2006.01)
*G06Q 20/32* (2012.01)

(52) U.S. Cl.
CPC ....... *G06Q 20/202* (2013.01); *G06Q 20/3276* (2013.01); *H04L 41/082* (2013.01); *H04L 67/306* (2013.01); *H04L 67/34* (2013.01)

(58) Field of Classification Search
CPC .............. G06Q 20/202; G06Q 20/3276; H04L 41/082; H04L 67/306; H04L 67/34
USPC ............................................. 705/21; 235/375
See application file for complete search history.

(56) References Cited

U.S. PATENT DOCUMENTS

| | | |
|---|---|---|
| 9,978,049 B2 | 5/2018 | Dunstan |
| 10,038,591 B1 | 7/2018 | Kanakarajan et al. |
| 2014/0289130 A1 | 9/2014 | Savolainen et al. |
| 2015/0230085 A1* | 8/2015 | Xue ...................... G06F 16/381 726/6 |
| 2016/0066183 A1* | 3/2016 | Conant ............... H04W 12/068 726/6 |

* cited by examiner

Primary Examiner — Toan C Ly
(74) *Attorney, Agent, or Firm* — Brian R. Galvin; Galvin Patent Law LLC

(57) ABSTRACT

A system and method comprising a server that automatically configures and sets up a restaurant's or business' information technology (IT) infrastructure, more specifically relating to point-of-sale devices (POS) and other networked devices such as scanners, tracking displays, and any other device that any business may use. Communication between the networked devices and the server is facilitated by a preconfigured router, wherein after initial communication with the server, the server may update firmware, operating parameters, and software packages of the preconfigured router and other networked devices.

12 Claims, 18 Drawing Sheets

Join a virtual private network when initialized and connected to a location's local network and the Internet
910

Wherein the a setup server is also connected to the virtual private network
920

Communicate with a POS device over the local network
930

Initiate transfer of configuration and setup data between a setup server and a POS device, when instructed by a setup server
940

Fig. 9

SYSTEM AND METHOD FOR THE
AUTOMATIC CONFIGURATION OF
DEVICES BY REMOTE COMMUNICATION
WITH A SERVER

CROSS-REFERENCE TO RELATED
APPLICATIONS

CROSS-REFERENCE TO RELATED APPLICATIONS

| Application Ser. No. | Date Filed | Title |
|---|---|---|
| Current application | Herewith | A SYSTEM AND METHOD FOR THE AUTOMATIC CONFIGURATION OF DEVICES BY REMOTE COMMUNICATION WITH A SERVER |
| Claims benefit of; and priority to: | | |
| 63/119,748 | Dec. 1, 2020 | SYSTEM AND METHOD FOR CONFIGURATION OF RESTAURANT DEVICES BY REMOTE COMMUNICATION WITH A PRECONFIGRED NETWORK ROUTER | the entire specification of each of which is incorporated herein by by reference.

BACKGROUND

Field of the Art

The disclosure relates to the field of computer setup, and more particularly to the field of remote setup of computing devices through the use of pre-generated or factory-made instructions shared through a network router.

Discussion of the State of the Art

In information technology, it is commonplace currently to ship devices with pre-installed software, with factory settings. This is known in the art sometimes as "factory defaults" or "factory default settings," and "vendor software," and the enterprise segment of the market is no different, shipping devices with pre-installed software—sometimes which a client or customer may pick prior to ordering, but sometimes which comes in predefined hardware-software packages—such as many desktops and laptops purchased from computer vendors. There are difficulties and limitations with this style of designing and shipping customer orders for computing devices. If a business is in need of a specific configuration of software that is non-standard or specialized in some way, or needs a group of devices to have a specific networking implementation installed and pre-configured, this is often not possible, but in the few cases it is possible, it is the case that the devices ship with the software and configurations, limiting the options of what is available for the customer. A customer may not, for instance, use their own hardware or devices, or design their own device configurations with this software, and then have it installed and configured for their needs, so that they are not required to have much networking or software customization and configuration knowledge. This is especially the case for restaurants, an entire industry which is slow to adopt technical changes due to the tremendous lack of ready-made and well-understood innovations in the space, despite the fact that numerous possible innovations in Point-Of-Sale ("POS") systems and online ordering have been made in recent years. It is more common for such services to be abstracted away from the restaurants entirely, such as with UBER EATS™ simply supplying the online ordering and delivery themselves. Integration of new systems for a restaurant where they frequently have no dedicated IT staff and limited understanding of complex computing systems, and when they may not have the resources to purchase all-new systems rather than use their already-operating POS systems, are difficult.

What is needed is a system and method that can automatically configure devices for merchants, automatically perform updates, and prioritize POS transactions over a compartmentalized network.

SUMMARY

Accordingly, the inventor has conceived and reduced to practice, a system and method for configuration of restaurant devices by remote communication with a preconfigured network router, comprising a server, text message relay server, Point-Of-Sale ("POS") device, mobile device, and a network router, whereby the server and network router communicate over a Virtual Private Network ("VPN") when the network router is plugged in and connected to the Internet, the network router communicates with the POS device or devices and sets up a local network such as a Local Area Network ("LAN") with the POS device or devices, and the server communicates to the network router instructions or authorization to execute pre-packaged instructions to set up the POS device or devices for the business.

According to a first embodiment, a system for the automatic configuration of devices by remote communication with a server is disclosed, comprising: a merchant database, wherein an account for a merchant is stored, each merchant account comprises authentication credentials and contact information; a preconfigured router; a server comprising at least a first plurality of programming instructions stored in the at least one memory of, and operating on at least one processor of, the computer system, wherein the first plurality of programming instructions, when operating on the at least one processor, causes the computer system to: retrieve the merchant account from the merchant database; and send the merchant account to a QR module; a QR module, comprising a first plurality of programming instructions stored in the memory and operating on the processor, wherein the first plurality of programming instructions, when operating on the processor, causes the computer system to: generate a QR code for the merchant comprising authentication credentials; a messaging service, comprising a second plurality of programming instructions stored in the memory and operating on the processor, wherein the second plurality of programming instructions, when operating on the processor, causes the computer system to: receive a notification of a successful delivery of physical devices to a merchant, wherein the notification triggers the messaging service to: generate a message comprising the QR code; and transmit the message to the merchant using the merchant's contact information, wherein the merchant subsequently scans the QR code; a network manager, comprising a third plurality of programming instructions stored in the memory and operating on the processor, wherein the third plurality of programming instructions, when operating on the processor, causes the computer system to: receive the authentication credentials; and initialize a compartmentalized network between the merchant and the server through the preconfigured router; and a software manager, comprising a fourth plurality of programming instructions stored in the memory and operating on the processor, wherein the fourth plurality of programming instructions, when operating on the processor, causes the computer system to: send new wireless operating parameters to the preconfigured router over the compartmentalized network; and send customized software packages to networked devices.

According to a second embodiment, a method for the automatic configuration of devices by remote communication with a server, comprising the steps of: receiving a notification of a successful delivery of physical devices to a merchant; generating a QR code from a merchant profile, the merchant profile comprising authentication credentials and contact information of the merchant; generating a message comprising the QR code; transmitting the message to the merchant using the merchant's contact information; receiving the authentication credentials; initializing a compartmentalized network between the merchant and the server; sending new wireless operating parameters to a networked device; and sending customized software packages to a networked device.

According to various embodiments; the QR code further comprises a link to download an application and the application automatically connects to the preconfigured router; the wireless operating parameters include new router firmware; the software manager sends periodic software updates to the networked devices; the customized software packaged are dependent on the purpose of the networked device.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 9 is a method diagram illustrating a network router setting up a Virtual Private Network and connecting to a setup server, and connecting to local POS devices, according to an embodiment.

DETAILED DESCRIPTION

Figure 1:
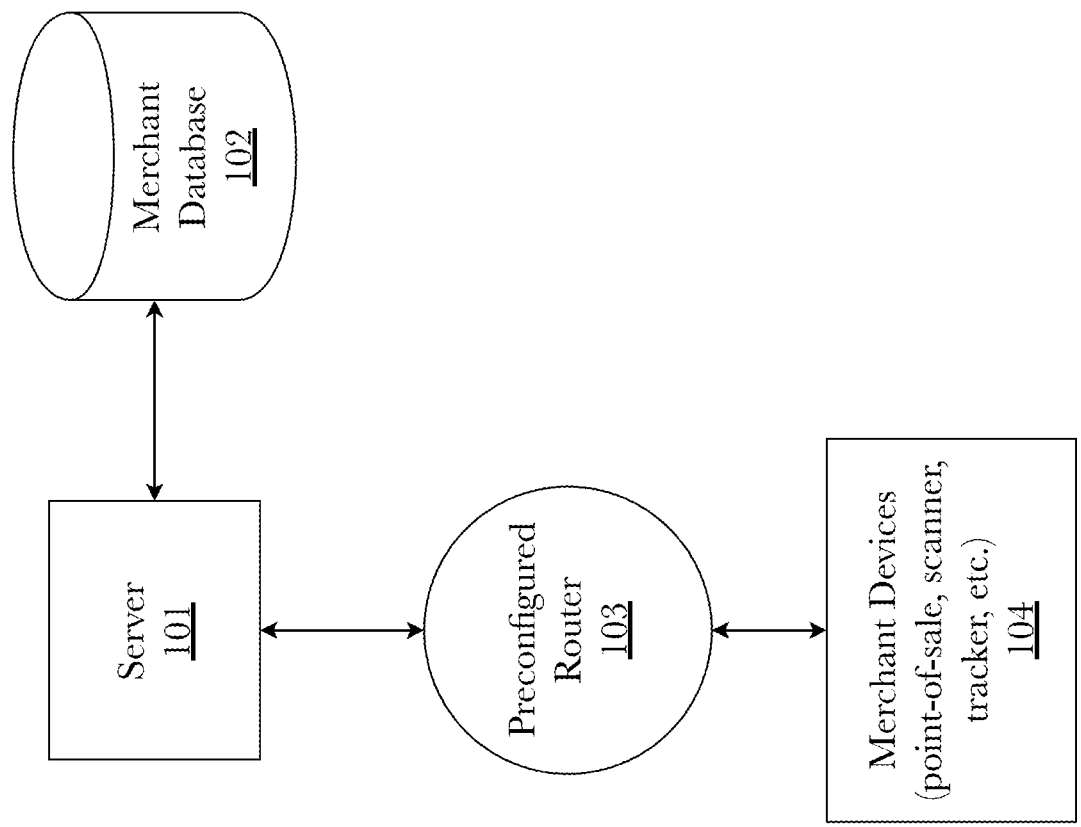
FIG. 1 is a block diagram illustrating one embodiment of a system for remote configuration of networked devices by a server through a preconfigured router.

The inventor has conceived, and reduced to practice, a system and method for configuration of restaurant devices by remote communication with a preconfigured network router. For simple understanding, this document discloses using short message service (SMS) for one type of communication between the server and various business devices or client mobile devices. While SMS is used extensively herein, it is to be understood that past, current, and future messaging services may be used and that embodiments are not limited to SMS. Examples of some other communication services may be multimedia messaging, push notifications, In-app messages, Facebook messaging, Skype, WhatsApp, iMessage, Discord, Internet-relay-chat (IRC), email, etc.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

"Neural network" as used herein means a computational model, architecture, or system made up of a number of simple, highly interconnected processing elements which process information by their dynamic state response to external inputs, and is thus able to "learn" information by recognizing patterns or trends. Neural networks, also sometimes known as "artificial neural networks" are based on our understanding of the structure and functions of biological neural networks, such as the brains of mammals. A neural network is a framework for application of machine learning algorithms.

"Business establishment" or "place of business" as used herein mean the location of any business entity with which customers may transact business. Typically, this will be a physical location where customers may enter the location and transact business directly with employees of the business, but may also be a delivery-based business. Many examples herein use a restaurant as the business establishment, but the invention is not limited to use in restaurants, and is applicable to any business establishment.

"Menu offering" or "menu item" as used herein refer to any prepared food and beverages that may be purchased from a restaurant. Typical menu offerings may include, but is not limited to: breakfast, lunch, and dinner entrees, a la carte items, appetizers, side dishes, beverages, and desserts.

"Food component" or "dish component" as used herein refer to the food items that are assembled to construct a menu item. This term should not be confused with the ingredients used to prepare a menu item, as food components are a step above ingredients. For example, a menu item may be spaghetti Bolognese with garlic bread, and the components this menu item is comprised of may be spaghetti pasta, Bolognese sauce, and garlic bread. Each of these components is created using various ingredients, for instance, the garlic bread is made using the ingredients French bread, butter, garlic, salt, pepper, and onion powder. The kitchen staff prepare each food component using a recipe of ingredients, and then assemble all necessary food components to create a menu item.

"POS device" or "point-of-sale device" as used herein refer to devices used or connected to devices used in the process of taking and accomplishing a customer's order. Examples may include tablets held and used by wait-staff in a restaurant, computers in a restaurant kitchen that display orders to kitchen staff for production, and computers used by administrative staff or ownership for the restaurant's operations, if they are connected to the system or network that other sales-oriented and production-oriented devices are connected to.

Conceptual Architecture

FIG. 1 is a block diagram illustrating one embodiment of a system for remote configuration of networked devices by a server through a preconfigured router. Merchant devices used by a business or restaurant 104 are automatically configured by a server 101 through a preconfigured router 103. A merchant database 102 stores a profile of a merchant and when merchant devices 104 connect to the server 101 via the preconfigured router 103, the merchant devices 104 are automatically associated with that merchant. The server 101 now automatically configures, updates, and manages the merchant devices 104. The merchant devices 104 may be equipped with a camera by which scanning a QR code may automatically connect and update said merchant devices by the server 101. According to one embodiment, merchant devices 104 by default connect to the preconfigured router's 103 Wi-Fi signal, wherein the preconfigured router 103 by default connects to the server 101 once connected to the Internet. A QR code given to a merchant may automatically install an application on a merchant mobile device or on a merchant device 104, whereby the application uses the QR code to automatically configure the merchant devices 104. The server 101 may further update the preconfigured router 103 with new firmware or operating parameters at any time.

The merchant profile on the merchant database 102 comprises contact information and authentication credentials. The contact information may include at least one of the following: an email, a phone number, a pager number, An IP address, a physical address, and other contact information not listed but otherwise obvious. Be authentication credentials are created whenever a merchant places an order for the preconfigured router 103 and merchant devices 104. The authentication credentials can use any security protocol or implementation used by computing devices and are not limited to SSH, TLS, and as their modern day cryptographic security protocols. The authentication credentials are further used to generate a QR code fast serves to automatically authenticate a merchant to the server 101 and subsequently the merchant database 102. the QR code sent to the merchant may include more than just authentication information, in some embodiments it also comprises a link to download mobile application and another embodiments may also include a link to a tutorial instructing the merchant how to plug in the merchant devices 104 on preconfigured router 103.

Figure 2:
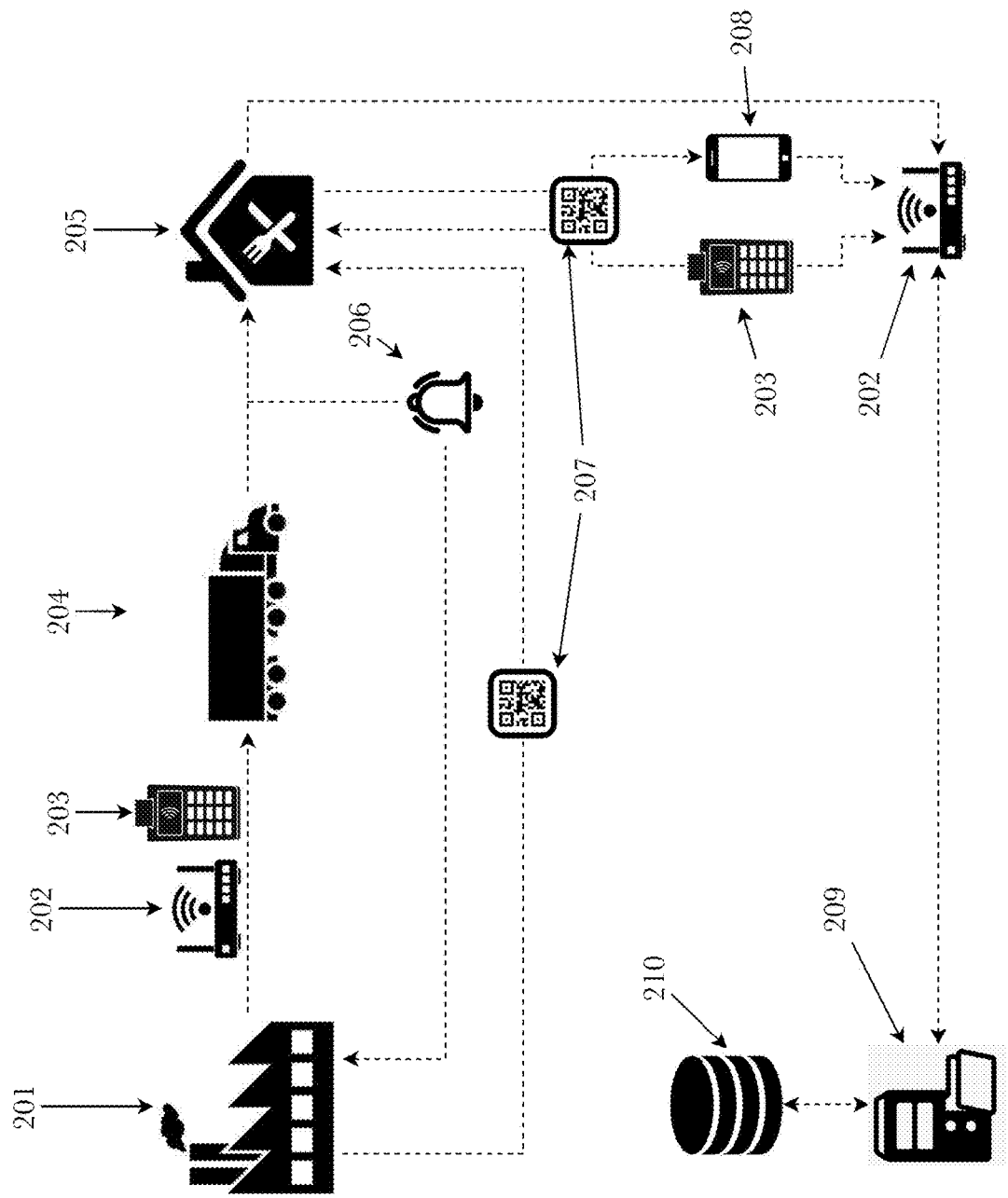
FIG. 2 is a block diagram illustrating a system and method for remote configuration of networked devices by a server through a preconfigured router.

FIG. 2 is a block diagram illustrating a system and method for remote configuration of networked devices by a server through a preconfigured router. The following is a system and method comprising a server 209 that automatically configures and sets up a restaurant 205 or business information technology (IT) infrastructure regarding point-of-sale devices (POS) 203 and other devices such as scanners, tracking displays, and any other device that any business may use.

An explanation of one embodiment of the system and method is as follows: A merchant 205 places an order(s) to a supplier 201 for one or more point-of-sale and other devices needed by the merchant 203. The supplier 201 packages said point-of-sale and other devices 203, including a preconfigured router 202 in order to be mailed 204 to the merchant 205. The point-of-sale and other merchant devices 203 are in a blank-canvas state with only security software and launcher software, while the router 202 is preconfigured.

Two embodiments are anticipated: the first whereby the devices 202, 203 are sent without recording of their unique identification numbers and are recorded later when the merchant 205 powers the devices 202, 203 on and they connect to the supplier's server 209, which in turn associates the devices 202, 203 with a merchant profile located on a merchant database 210 and associated by the QR code 207. A second embodiment whereby the devices 202, 203 packaged by the supplier 201 have their MAC addresses, serial numbers, and/or other unique identification numbers recorded and associated with the merchant's profile before shipping. Either embodiment will have the tracking number given by the logistics company 204 associated with the merchant 205, wherein the merchant has a profile on the supplier's 201 database 210 with a contact phone number and email, or other messaging service and other profile information.

The supplier's server 209 automatically tracks the shipment 204 of devices 202, 203 to the merchant 205 and upon successful delivery, a notification 206 from the logistics company causes a messaging service module on the server 209 to be triggered and send a message to the merchant's mobile device 208 with a tutorial and a QR code 207. The message could be an SMS, MMS, email, or other digital or analog means by which a QR code may be sent. According to another embodiment, the QR code 207 may be printed and mailed. The QR code 207 is generated by a QR module, wherein a QR code 207 is generated for each merchant and when scanned installs an app on the merchant's device 208, as well as containing credentials for of merchant to automatically log him or her into the app on his or her mobile device 208 and to automatically connect the merchant's mobile device 208 to the preconfigured router 202. Some merchant devices and POS devices 203 may also have the ability to scan QR codes 207 and may be used in place of the merchant's mobile device 208 in some embodiments. The tutorial may also include instructions for the merchant to manually download the app and login via a username and password, biometrics, or the QR code 207. The tutorial may further go on to instruct the merchant to open the crate, plug the preconfigured router 202 into a modem with Internet access, and power on the router 202. Router 202 will automatically make communication with supplier's server 209. A network manager on the supplier's server 209 will then create a bespoke and compartmentalized network between the preconfigured router 202 and the supplier's server 209. In one embodiment, the server will send firmware and new credentials to the router 202 which may include changing the default SSID and other wireless parameters.

The tutorial may then ask the merchant to power on one or more of the point-of-sale devices (or other restaurant/business devices) 203, open the launcher, wherein the launcher will ask the merchant to identify the purpose of the device, and then the launcher will automatically connect to the preconfigured router 202 which will facilitate communication with the server 209. A software manager on the server will then upload bespoke software packages to the device based on the merchant's choices. During each initial communication between a device and the server, the server will record unique identification numbers and associate those devices with the merchant profile.

The order in which these steps take place are not bound to the order described herein. The description from above is simply exemplary and some steps are to be inferred as obvious to those with ordinary skill in the art, such as gathering merchant information when an order is placed, types of authentication i.e., TTL, HTTPS, etc., and QR code generation to name a few.

Figure 3:
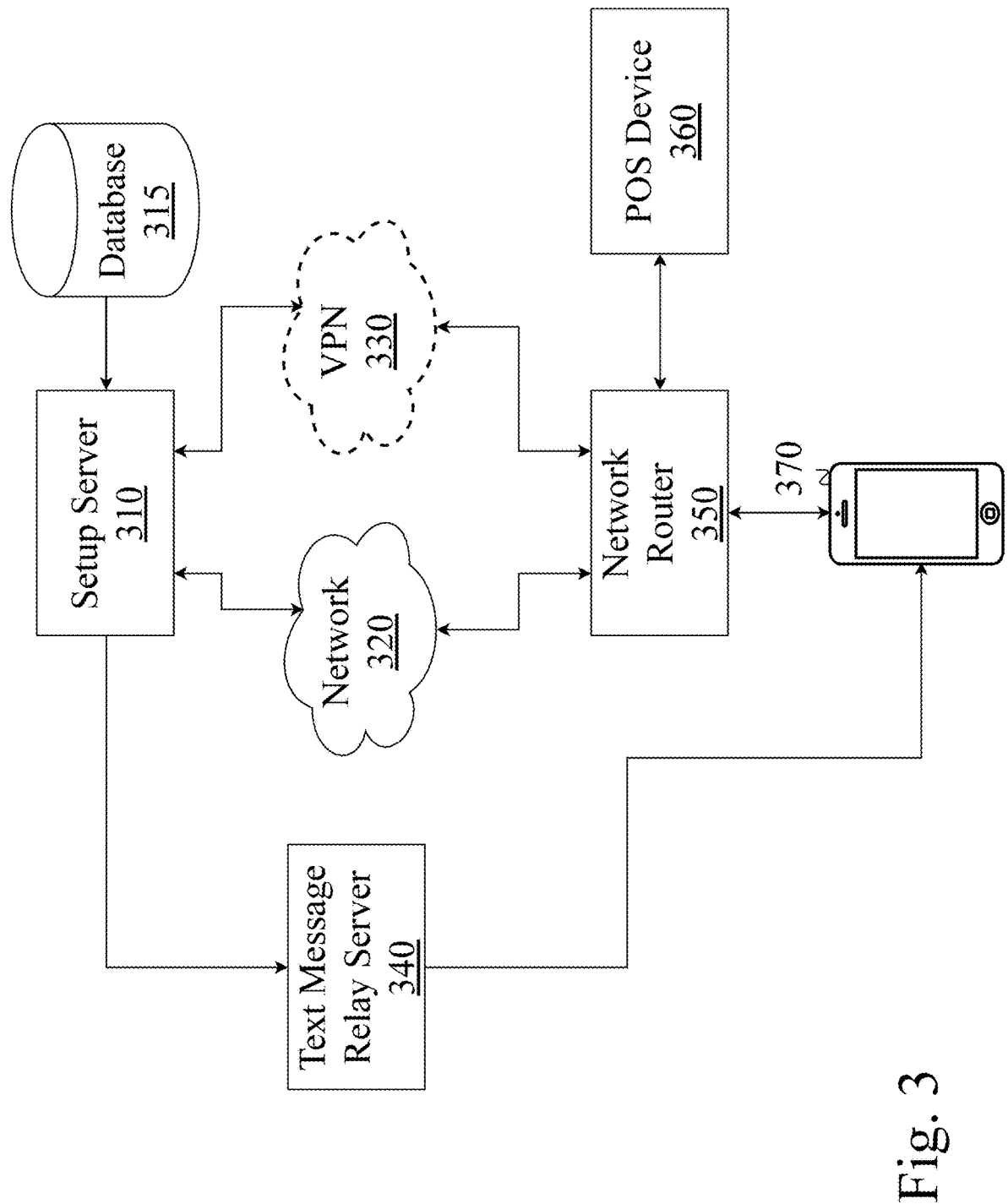
FIG. 3 is a diagram illustrating a system for configuration of restaurant devices by remote communication with a preconfigured network router, according to one aspect.

FIG. 3 is a diagram illustrating a system for configuration of restaurant devices by remote communication with a preconfigured network router, according to one aspect. Included in the system is a setup server 310, which may be a cloud service offering, a dedicated hosting solution, virtual shared server, virtual private server, or another implementation of a web server solution. Such a server may operate any one of a variety of possible operating systems, such as a LINUX™ based operating system or a WINDOWS™ based operating system. Such a server may be connected to the Internet or another network 320, or a variety of networks including Local Area Networks ("LAN"), via at least one network adapter that may operate over a physical cable connection or wirelessly such as with WIFI™. The setup server 310 may be connected to, or may operate, a database 315, which may be one of many varying database implementations, including a SQL-based database such as MYSQL™ or MICROSOFT SQL SERVER™, a NoSQL database such as MONGODB™ or DYNAMODB™, or an ORACLE™ database, or some other form of database. It may be hosted on the same hardware or virtual instance as a server, or hosted separately and provided by a service provider, such as some cloud service providers including AMAZON™ and MICROSOFT™ offer, with their services AMAZON WEB SERVICES™ and WINDOWS AZURE™ respectively. Such a database may store configuration data, user data, user location or communications data, and data regarding VPN access. A setup server 310 communicates with a user device 370 over a network 320, which may be a local area network, or a wide area network such as the Internet, capable of connecting at least two devices for communications purposes. Protocols for such communications may include TCP/IP, UDP, and may include the use of internet services and tools such as messenger programs of various social networks or communications platforms including SKYPE™, DISCORD™, FACEBOOK™, and others. A setup server 310 further communicates with a network router 350 over a VPN 330, which may be a remote access VPN, or extranet-based site-to-site VPN, operating over the Internet, and which may be either managed and operated by the setup server 310 or by a third-party VPN provider with which the setup server 310 is configured to operate with. The setup server 310 may also be connected to, and transmit data to, a text message relay server 340, such as a service provided by TWILIO™, may be a server or distributed cloud service that relays short message service ("SMS") messages sent from a non-cellular device to either a cellular or non-cellular recipient. In some alternative embodiments, the text message relay server 340 may be a server that handles and routes non-SMS text messages such as FACEBOOK MESSENGER™ messages, emails, and other forms of internet or non-SMS communications. The network router 350 communicating over a VPN with the setup server 310 may be a wireless router such as those commonly built by companies including CISCO™ or others, or a wireless access point that connects to a separate internet router, that provides access for connected wireless devices to the internet, and communicates with at least one, but potentially a plurality of, POS devices 360, which may be any device connected to or involved with the sale of a good or service for a business. Examples may include tablets held and used by wait-staff in a restaurant, computers in a restaurant kitchen that display orders to kitchen staff for production, and computers used by administrative staff or ownership for the restaurant's operations, if they are connected to the system or network that other sales-oriented and production-oriented devices are connected to. Such a connection is established with a LAN set up by the network router, or integrated with the network router, to enable it to set up and configure the devices based on data received or exchanged with the setup server 310. A customer device 370 may be a cellular device such as an IPHONE™ or ANDROID™ phone or other smartphone, a tablet such as an IPAD™ or other tablet, a personal digital assistant or non-smartphone cellular phone, or even a laptop computer or desktop computer according to some embodiments.

According to an embodiment, a user may order and install the network router 350, and receive a text message communication from one of the prior mentioned methods on their device 370 either before or after installing and turning on the network router. Upon the network router's 350 installation and activation, it will connect to a VPN 330 it is preconfigured with the credentials to access over the internet 320, and, separately, set up or integrate with an existing LAN that connects to the POS device or devices 360. The user, which may be an administrator, general manager, or other individual in the business, may interact with the text message received from the setup server 310. Upon interacting with the text message, such as clicking or tapping on a link or scanning a QR code, the setup server sends network and POS device setup instructions to the network router 350, and the POS devices are set up by the network router, allowing for up-to-date setups to be delivered to users based on the status of the setup server and database, and allowing customers to operate their own hardware configurations and physical setups without having to buy entirely new hardware, save for the network router. The POS device setup may include setting up of a Virtual Machine ("VM") for the network router 350 to interact with and configure, or the network router may configure the devices and install separate software without a VM instance running on them.

Figure 4:
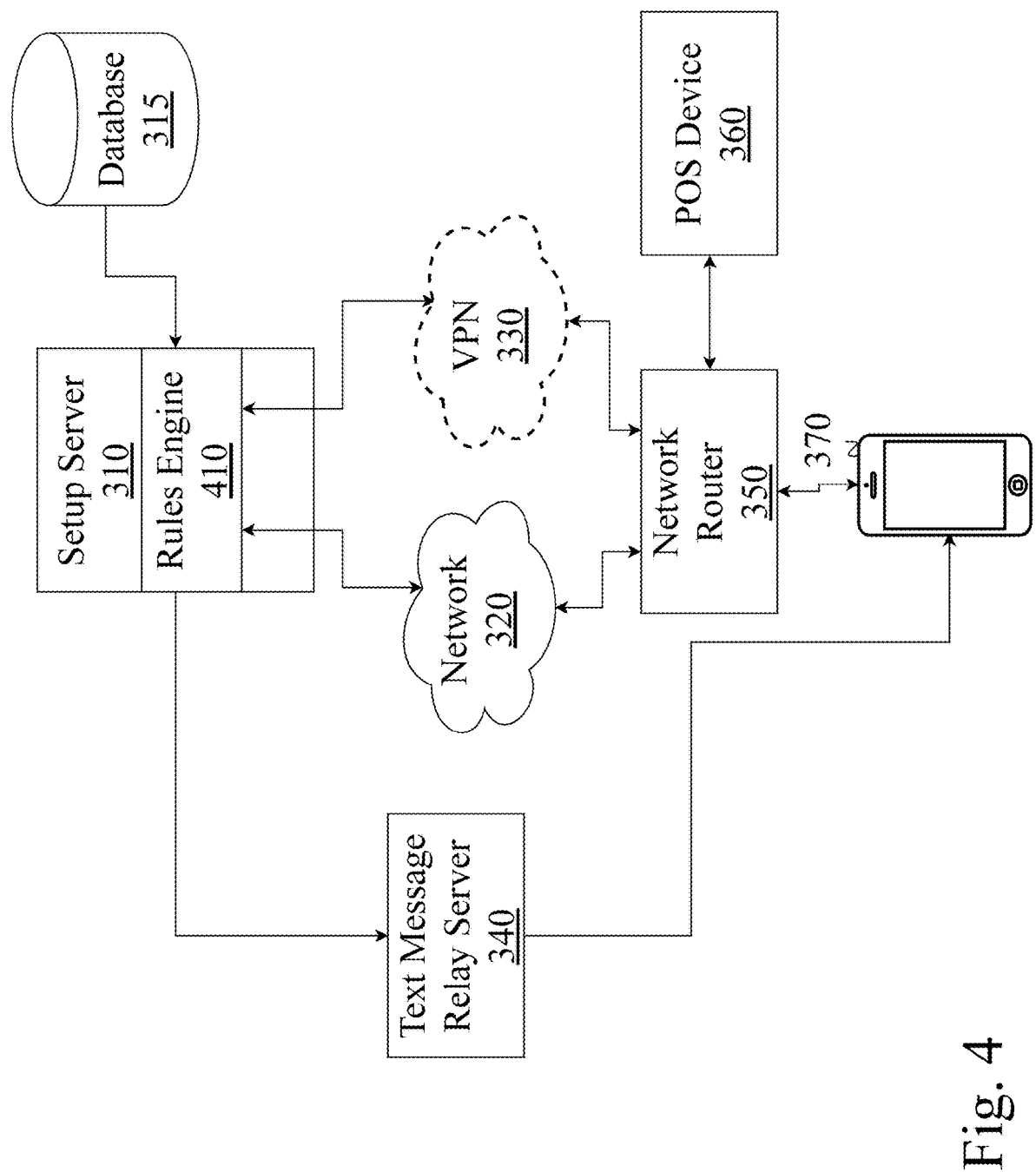
FIG. 4 is a diagram illustrating a configuration of restaurant devices by remote communication with a preconfigured network router, with a rules engine dictating setup server behavior according to another aspect.

FIG. 4 is a diagram illustrating a configuration of restaurant devices by remote communication with a preconfigured network router, with a rules engine dictating setup server behavior according to another aspect. Included in the system is a setup server 310, which may be a cloud service offering, a dedicated hosting solution, virtual shared server, virtual private server, or another implementation of a web server solution. Such a server may operate any one of a variety of possible operating systems, such as a LINUX™ based operating system or a WINDOWS™ based operating system. Such a server may be connected to the Internet or another network 320, or a variety of networks including Local Area Networks ("LAN"), via at least one network adapter that may operate over a physical cable connection or wirelessly such as with WIFI™. The setup server 310 may be connected to, or may operate, a database 315, which may be one of many varying database implementations, including a SQL-based database such as MYSQL™ or MICROSOFT SQL SERVER™, a NoSQL database such as MONGODB™ or DYNAMODB™, or an ORACLE™ database, or some other form of database. It may be hosted on the same hardware or virtual instance as a server, or hosted separately and provided by a service provider, such as some cloud service providers including AMAZON™ and MICROSOFT™ offer, with their services AMAZON WEB SERVICES™ and WINDOWS AZURE™ respectively. Such a database may store configuration data, user data, user location or communications data, and data regarding VPN access. A setup server 310 communicates with a user device 370 over a network 320, which may be a local area network, or a wide area network such as the Internet, capable of connecting at least two devices for communications purposes. Protocols for such communications may include TCP/IP, UDP, and may include the use of internet services and tools such as messenger programs of various social networks or communications platforms including SKYPE™, DISCORD™, FACEBOOK™, and others. A setup server 310 further communicates with a network router 350 over a VPN 330, which may be a remote access VPN, or extranet-based site-to-site VPN, operating over the Internet, and which may be either managed and operated by the setup server 310 or by a third-party VPN provider with which the setup server 310 is configured to operate with. The setup server 310 may also be connected to, and transmit data to, a text message relay server 340, such as a service provided by TWILIO™, may be a server or distributed cloud service that relays short message service ("SMS") messages sent from a non-cellular device to either a cellular or non-cellular recipient. In some alternative embodiments, the text message relay server 340 may be a server that handles and routes non-SMS text messages such as FACEBOOK MESSENGER™ messages, emails, and other forms of internet or non-SMS communications. The network router 350 communicating over a VPN with the setup server 310 may be a wireless router such as those commonly built by companies including CISCO™ or others, or a wireless access point that connects to a separate internet router, that provides access for connected wireless devices to the internet, and communicates with at least one, but potentially a plurality of, POS devices 360, which may be any device connected to or involved with the sale of a good or service for a business. Examples may include tablets held and used by wait-staff in a restaurant, computers in a restaurant kitchen that display orders to kitchen staff for production, and computers used by administrative staff or ownership for the restaurant's operations, if they are connected to the system or network that other sales-oriented and production-oriented devices are connected to. Such a connection is established with a LAN set up by the network router, or integrated with the network router, to enable it to set up and configure the devices based on data received or exchanged with the setup server 310. A customer device 370 may be a cellular device such as an IPHONE™ or ANDROID™ phone or other smartphone, a tablet such as an IPAD™ or other tablet, a personal digital assistant or non-smartphone cellular phone, or even a laptop computer or desktop computer according to some embodiments. A rules engine 410 may be a software package operating as part of the setup server 310, or it may be operating on a separate device connected to the setup server 310 over a local or wide area network including the Internet, communicating with and serving as an intermediary between the setup server 310 and any networks 320, 330 it may communicate through, as well as between the setup server 310 and text message relay server 340.

According to an embodiment, a user may order and install the network router 350, and receive a text message communication from one of the prior mentioned methods on their device 370 either before or after installing and turning on the network router. Upon the network router's 350 installation and activation, it will connect to a VPN 330 it is preconfigured with the credentials to access over the internet 320, and, separately, set up or integrate with an existing LAN that connects to the POS device or devices 360. The user, which may be an administrator, general manager, or other individual in the business, may interact with the text message received from the setup server 310. Upon interacting with the text message, such as clicking or tapping on a link or scanning a QR code, the setup server sends network and POS device setup instructions to the network router 350, and the POS devices are set up by the network router, allowing for up-to-date setups to be delivered to users based on the status of the setup server and database, and allowing customers to operate their own hardware configurations and physical setups without having to buy entirely new hardware, save for the network router. The POS device setup may include setting up of a Virtual Machine ("VM") for the network router 350 to interact with and configure, or the network router may configure the devices and install separate software without a VM instance running on them.

According to another aspect, a rules engine 410 may exist in the system as part of, or separate but connected to, the setup server 310, and may exist as a distinct input-output filtering device or service. In this way, the rules engine may specify what devices may connect with the setup server 310 or VPN 330, what texts may go outbound from the setup server 310, what text message interactions may be registered as valid or what response their interactions may result in, and more, adding a layer of control and abstraction from the setup server 310 itself.

Detailed Description of Exemplary Aspects

Figure 5:
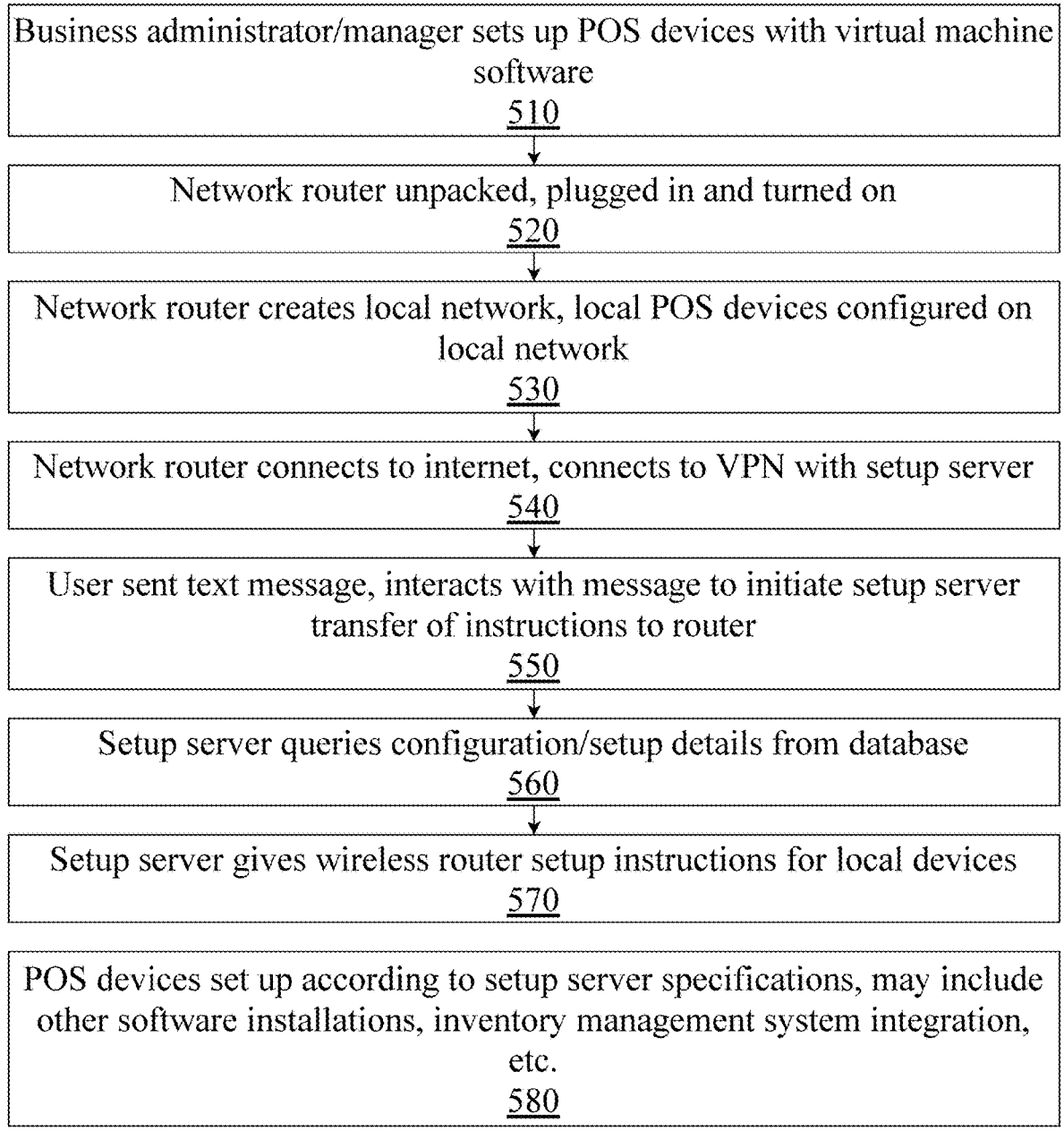
FIG. 5 is a method diagram illustrating a network router being unpacked and set up, and communicating with a setup server.

FIG. 5 is a method diagram illustrating a network router being unpacked and set up, and communicating with a setup server. A network router in this context may be a complete wireless network router, or a wireless endpoint connected to a network router, or an all-in-one modem and wireless router. First, a business administrator, manager, owner, or other employee ma set up their POS devices with virtual machine software 510, the virtual machine software comprising at least a network adapter and ability to install and operate software when specially instructed by the network router, for purposes such as kitchen management, inventory management, order management, and other tasks that software may be designed for, to aid a business in its operation. Once the network router is unpacked, plugged in and turned on 520, the network router creates or joins a local network, which the local POS devices will be configured to join 530 through the use of the VM software. The network router may join a network already in existence if it is a wireless access point for another router, or may create and manage the local network itself, with the POS devices connecting to it. The network router may then connect to the Internet, and set up a VPN connection to connect with a remote setup server 540. Such connections may take place over a variety of internet connection protocols such as TCP/IP, UDP, OpenVPN, or others, or a combination of protocols and connectivity technologies. A text message may then be sent to the user from the setup server through a text message relay server, the text message including an interactable element such as a QR code or a hyperlink, interactions with the message initiating the setup server's transfer of instructions to the network router 550. Such a sequence of operations may be, for instance, a link being transmitted to a user's phone, the user setting up the network router, and then tapping the link once the router has been set up, the network router then setting up the locally connected POS devices. The instructions to be transmitted to the network router from the setup server are queried from the setup server's connected database 560, the term "database" being used here to refer to any long-term data storage solution, which may be an actual database instance, multiple database instances, a cloud data storage solution, or some other data storage and reading solution. The setup server may then transmit the network router setup instructions for local POS 570, instructions which may include which software packages to install on each device, how to configure such packages, what the relationship between the devices should be with the different software packages, their inventory management software, and more 580.

Figure 6:
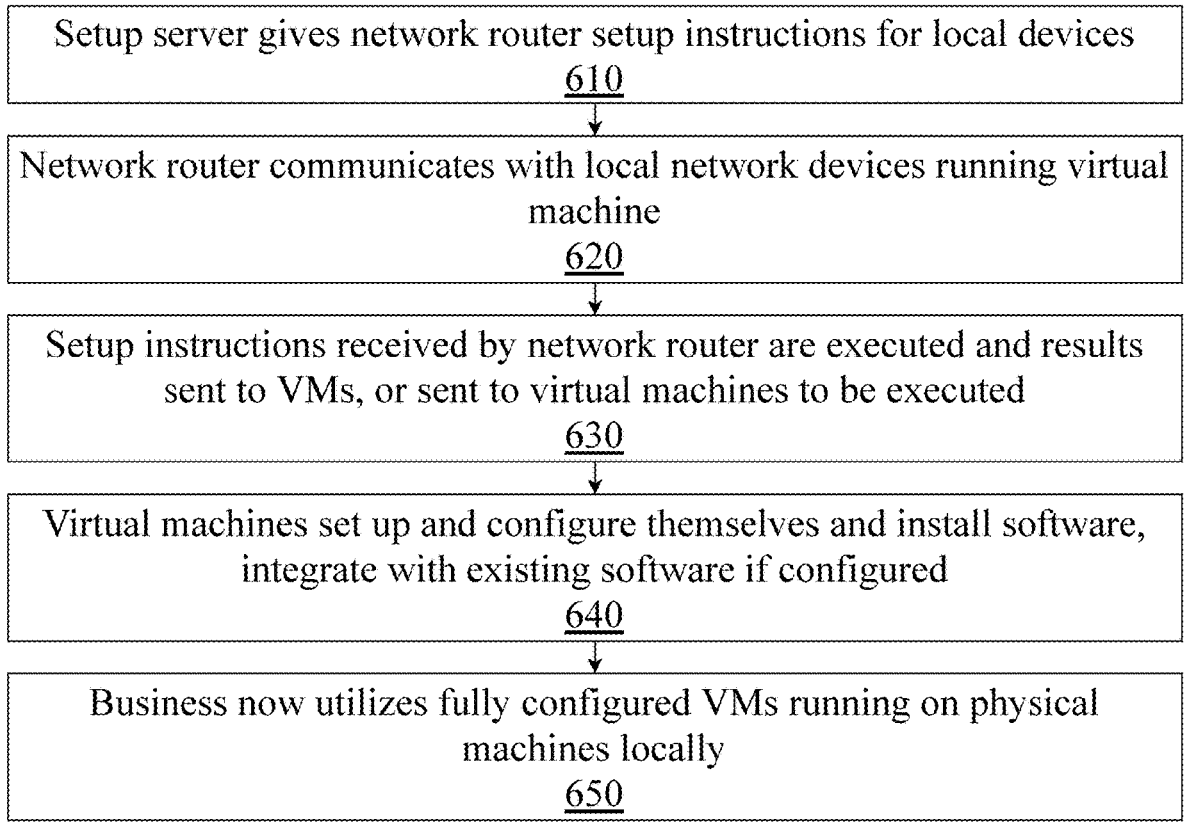
FIG. 6 is a method diagram illustrating a setup server communicating with a network router, the network router then communicating with and setting up and configuring connected POS devices.

FIG. 6 is a method diagram illustrating a setup server communicating with a network router, the network router then communicating with and setting up and configuring connected POS devices. A setup server may transmit setup instructions for local POS devices, to a network router 610, after which time the network router communicates the instructions with the local network devices running compatible virtual machine software 620. The setup instructions received by the network router are executed and the results of the setup instructions are sent to the local POS devices hosting the VMs, or, alternatively, the instructions themselves are sent to the virtual machines to be executed 630 rather than being executed on the network router first. The virtual machines may then set up and configure themselves and install any requisite or specified software, and integrate with existing software if desired 640, allowing the business to now utilize fully configured VMs running on physical machines locally 650, without requiring the business to buy all new hardware devices to install, instead only requiring the installation and setup of a single network router or wireless access point.

Figure 7:
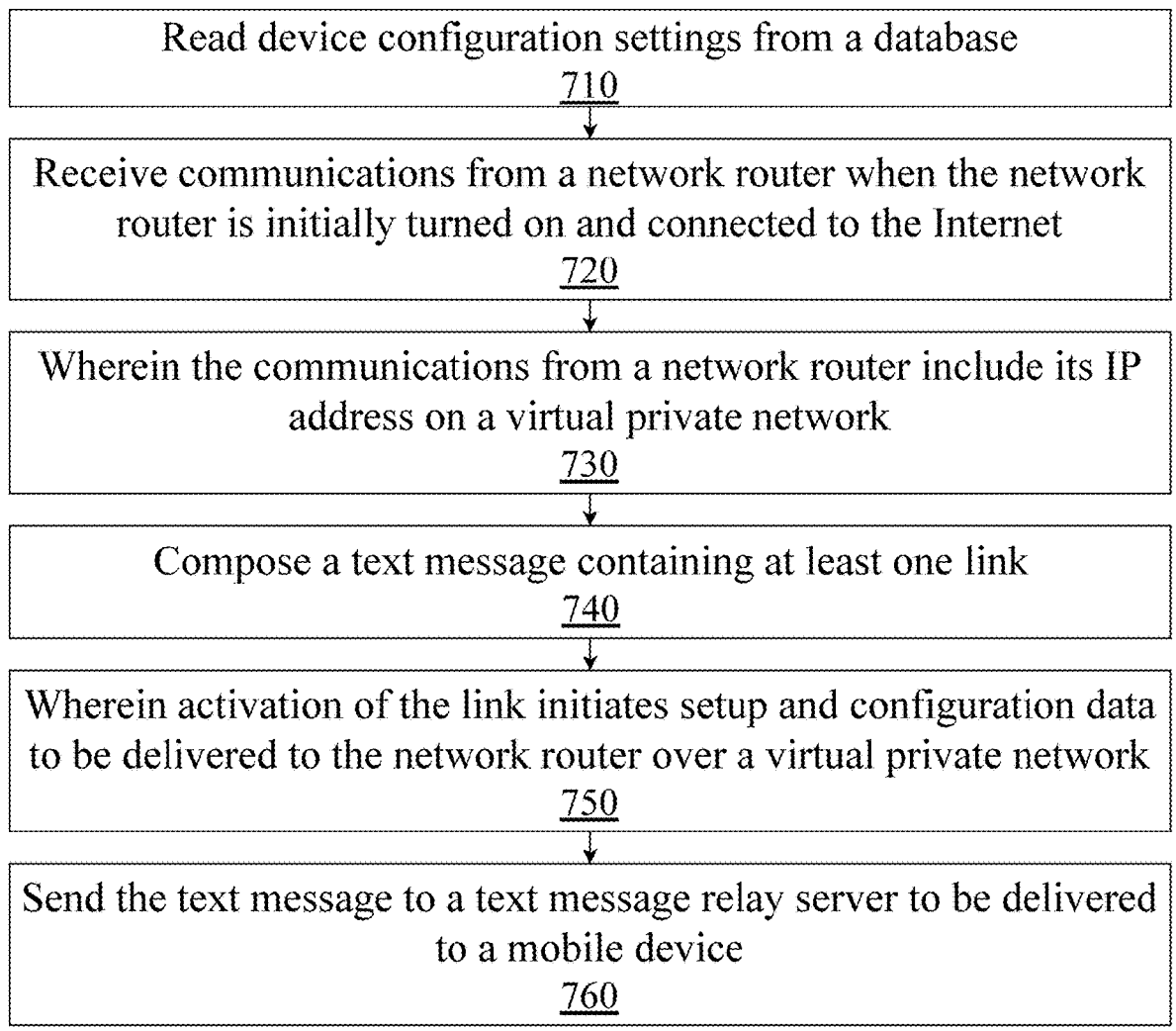
FIG. 7 is a method diagram illustrating the function of a setup server, according to an aspect.

FIG. 7 is a method diagram illustrating the function of a setup server, according to an aspect. A possible first step may be for the setup server to read device configuration settings from a database 710, such settings being either relevant to a specific upcoming device or network setup, or perhaps there are a very limited number of configurations and they are all loaded into memory to be dispensed to network routers on-demand. The setup server may then receive communications from a network router when the network router is initially turned on and connected to the Internet 720, through a VPN connection, wherein the communications from a network router includes its IP address on the virtual private network 730. This essentially constitutes a heartbeat signal, whereby the network router connects to the VPN that the setup server is connected to, and sends a signal indicating where in the digital space the router is able to be reached for further communications. The setup server may then compose a text message containing at least one link or QR code or other interactable data for a user 740, wherein activation of the link or other data initiates the setup and configuration data to be delivered from the setup server to the network router over the VPN 750, and then send the text message to a text message relay server to be delivered to a mobile device 760.

In another embodiment, the text message generation and sending may occur earlier in the process, before the network router is installed or sends its heartbeat signal to the setup server.

In yet another embodiment, it may be the case that the user does not receive the text message on a mobile device. For instance, it may be sent over a messaging client such as FACEBOOK MESSENGER™ or some other client, and may be receivable on any number of devices including smartphones, tablets, laptop or desktop computers, and potentially others.

In yet another embodiment, the text message may include a QR code that must be scanned by the network router, rather than a link that must be tapped or clicked to activate the network router once it is connected to the setup server.

Figure 8:
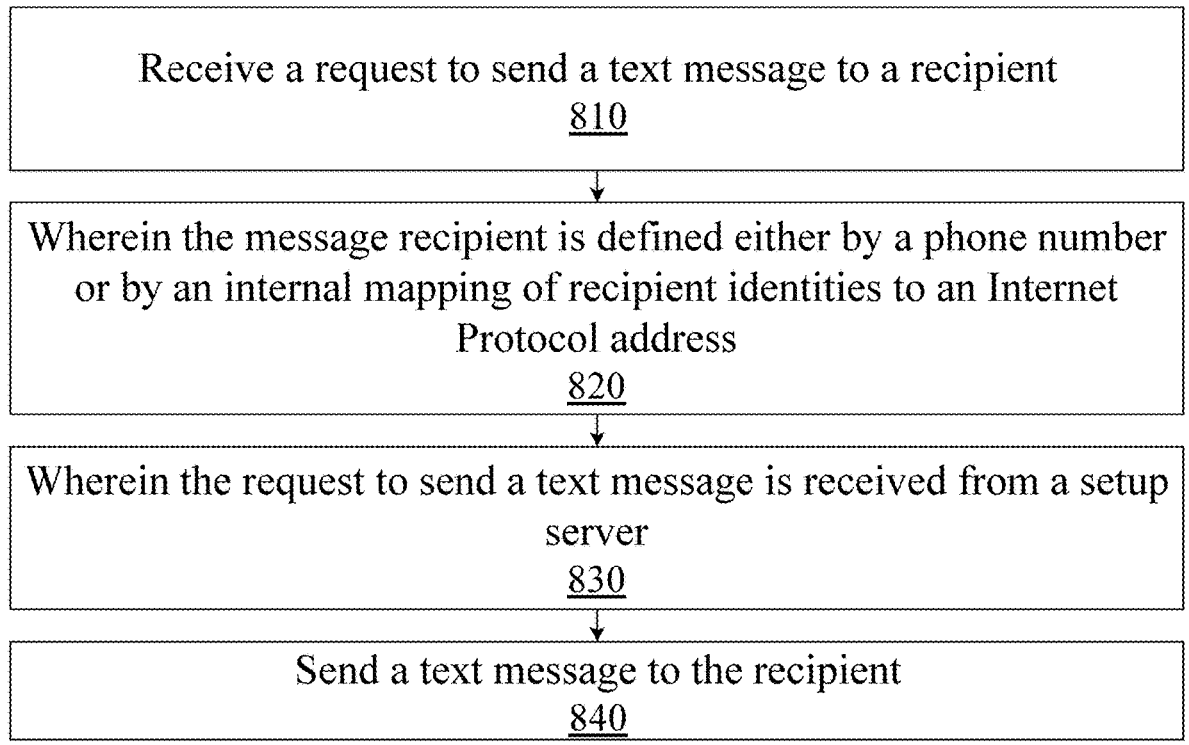
FIG. 8 is a method diagram illustrating the function of a text message relay server, as used to relay text messages from a server desiring to send them and a recipient who may or may not be a mobile device capable of ordinarily receiving short message service messages, according to a preferred embodiment.

FIG. 8 is a method diagram illustrating the function of a text message relay server, as used to relay text messages from a server desiring to send them and a recipient who may or may not be a mobile device capable of ordinarily receiving short message service ("SMS") messages, according to a preferred embodiment. A text message relay server may comprise a server or cloud service such as those offered by TWILIO™ or AMAZON WEB SERVICES™ or some other server implementation or service provider, and may be capable of accepting text data in a variety of forms including SMS messages, JSON text strings received over an internet connection, or other forms of data, and may relay them as SMS messages, emails, text messages over messaging platforms, or other forms of text messages. A text message relay server may first receive a request from a server or other device or service, to send a text message to a recipient 810. Such a request may include the recipient's information, the identity of the sender, content of the message to relay, and the method to relay it to the user, wherein the message recipient is defined either by a phone number or by an internal mapping of recipient identities to an Internet Protocol address 820. An alternative embodiment may have the recipient instead specified by a user identity on a messaging service such as FACEBOOK™ or another social media or messaging platform, such as SKYPE™ DISCORD™. In either embodiment, the request to send a text message is received from a setup server 830 or rules engine depending on whether or not a separate rules engine is present in the system, and the text message relay server may accomplish the sending of the text message to the specified recipient 840. The content of the text message may include a link, a QR code, an interactive button, or some other element which a user may interact with in order to activate their network router when it is plugged in and connected to the internet and the VPN with the setup server.

FIG. 9 is a method diagram illustrating a network router setting up a Virtual Private Network and connecting to a setup server, and connecting to local POS devices, according to an embodiment. The router first, upon being activated and connected to the Internet, joins a virtual private network when initialized and connected to a location's local network and the Internet 910, or may set up such a network if it does not already exist. The setup server, for creation of a new VPN, would need to be invited to or otherwise pinged by the network router, to join the VPN, in that implementation, but in either case the setup server must also become connected to the virtual private network 920. The network router may then communicate with a POS device over the local network 930 it previously set up, and upon receiving setup or configuration instructions from a setup server, the network router may initiate transfer of configuration and setup data between the setup server and a POS device or plurality of POS devices, when instructed by a setup server 940.

Figure 10:
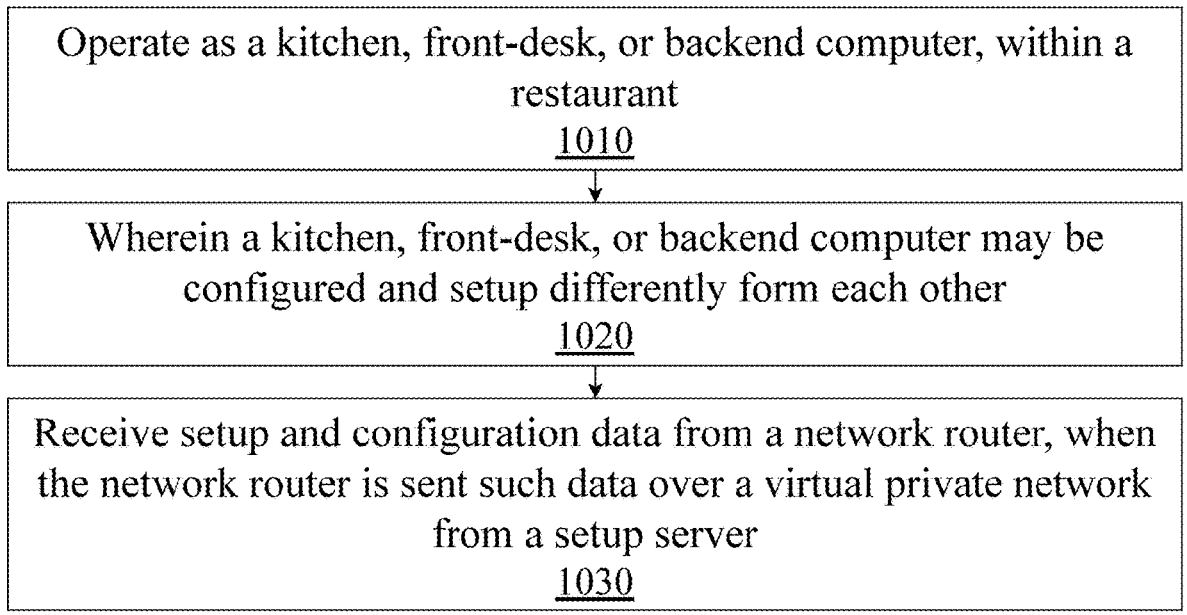
FIG. 10 is a method diagram illustrating a POS device operating as one of several possible device types in a restaurant, and receiving data to be set up and configured as per instruction from a network router, according to a preferred embodiment.

FIG. 10 is a method diagram illustrating a POS device operating as one of several possible device types in a restaurant, and receiving data to be set up and configured as per instruction from a network router, according to a preferred embodiment. Depending on the implementation and physical location and orientations of devices, and the needs of the business, a POS device may operate as a kitchen device (such as one capable of displaying orders or other kitchen-critical information to kitchen staff), front-desk (such as for handling reservations, seating arrangements, and payments), or backend computer (such as an inventory management computer or other device in an inventory area, a manager's computer, or a POS device located elsewhere in the restaurant away from the front-desk reception), within a restaurant 1010. Such devices may be identical devices (such as IPAD™ or other tablet computers), or some combination of physical device orientations and configurations that may differ from each other, or be completely non-standardized and all have different physical characteristics and setups 1020. The device or devices will then, as far as they are involved in the process according to a preferred embodiment, receive setup and configuration data from the network router, when the network router is sent such data over a virtual private network from a setup server 1030.

For example, a virtual machine may be installed and operate on a kitchen computer in a restaurant. The virtual machine may be a specific offering by a company, designed to be compatible with a network router that attempts to set up the computer as illustrated herein. The network router may detect the virtual machine on the local network when installed, due to, for instance, a specific ping message sent on the local network, from the virtual machine to the new router it is connected to, upon identifying the router as the network router it is compatible with. The two devices then know each other on the network and are aware that each other is a compatible device. The network router may then communicate with the POS device in the kitchen, with the virtual machine loaded onto the physical machine to be specific, to instruct it in what software to install, from where to install it, and how to configure it, in a manner specific to the network router and VM combination.

Figure 11:
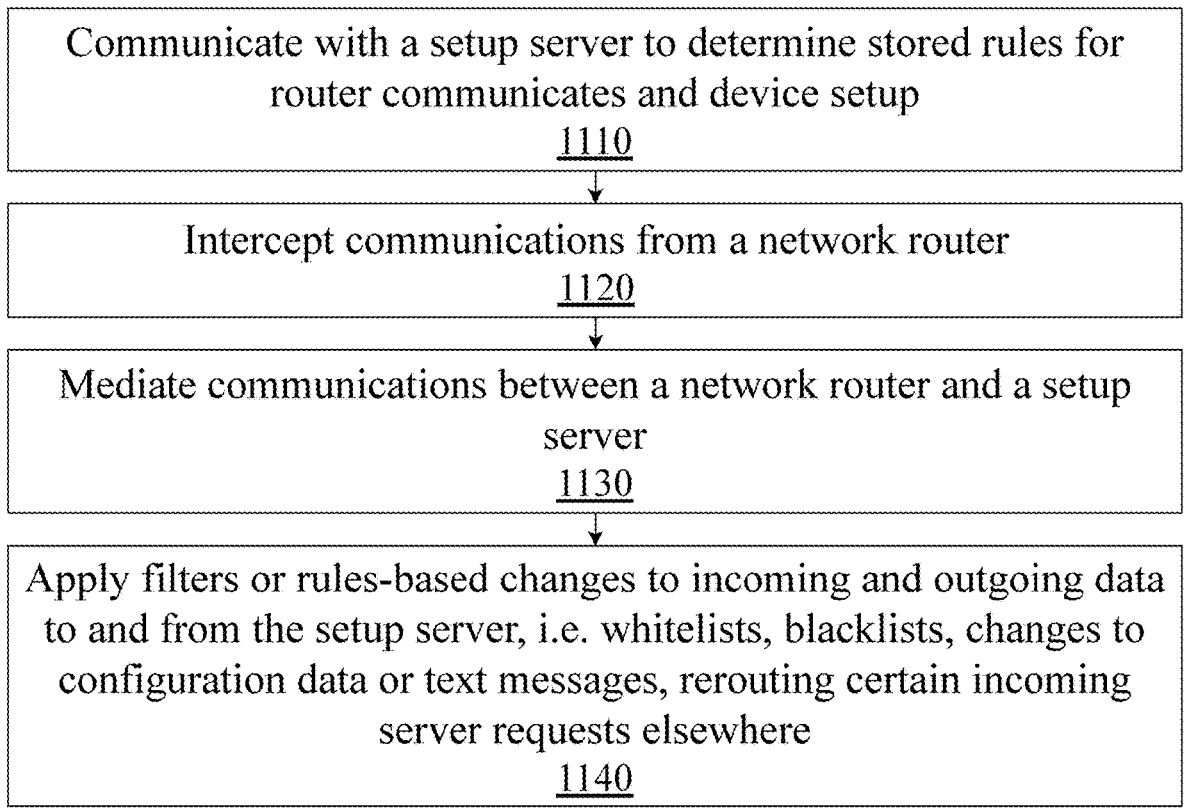
FIG. 11 is a method diagram illustrating steps taken by a rules engine to filter and control access to and responses from a setup server, according to one embodiment.

FIG. 11 is a method diagram illustrating steps taken by a rules engine to filter and control access to and responses from a setup server, according to one embodiment. First, a rules engine may communicate with a setup server, to determine the stored rules for router communications and device setup 1110, which may include rules and algorithms for determining behaviors for communicating between the setup server and a network router, how to connect to a VPN, what VPN connections are permitted, as well as provide firewall functionality to external connections both incoming and outgoing, depending on the implementation. A rules engine may intercept communications from a network router 1120 that are incoming to the setup server, as well as mediate communications between a network router and a setup server 1130 for outgoing communications from the setup server to the network router. The rules engine may then apply filters or rules-based changes to incoming and outgoing data to and from the setup server, such as but not limited to whitelists, blacklists, changes to configuration data or text messages, rerouting certain incoming server requests elsewhere, or other changes to incoming and outgoing data 1140.

Figure 12:
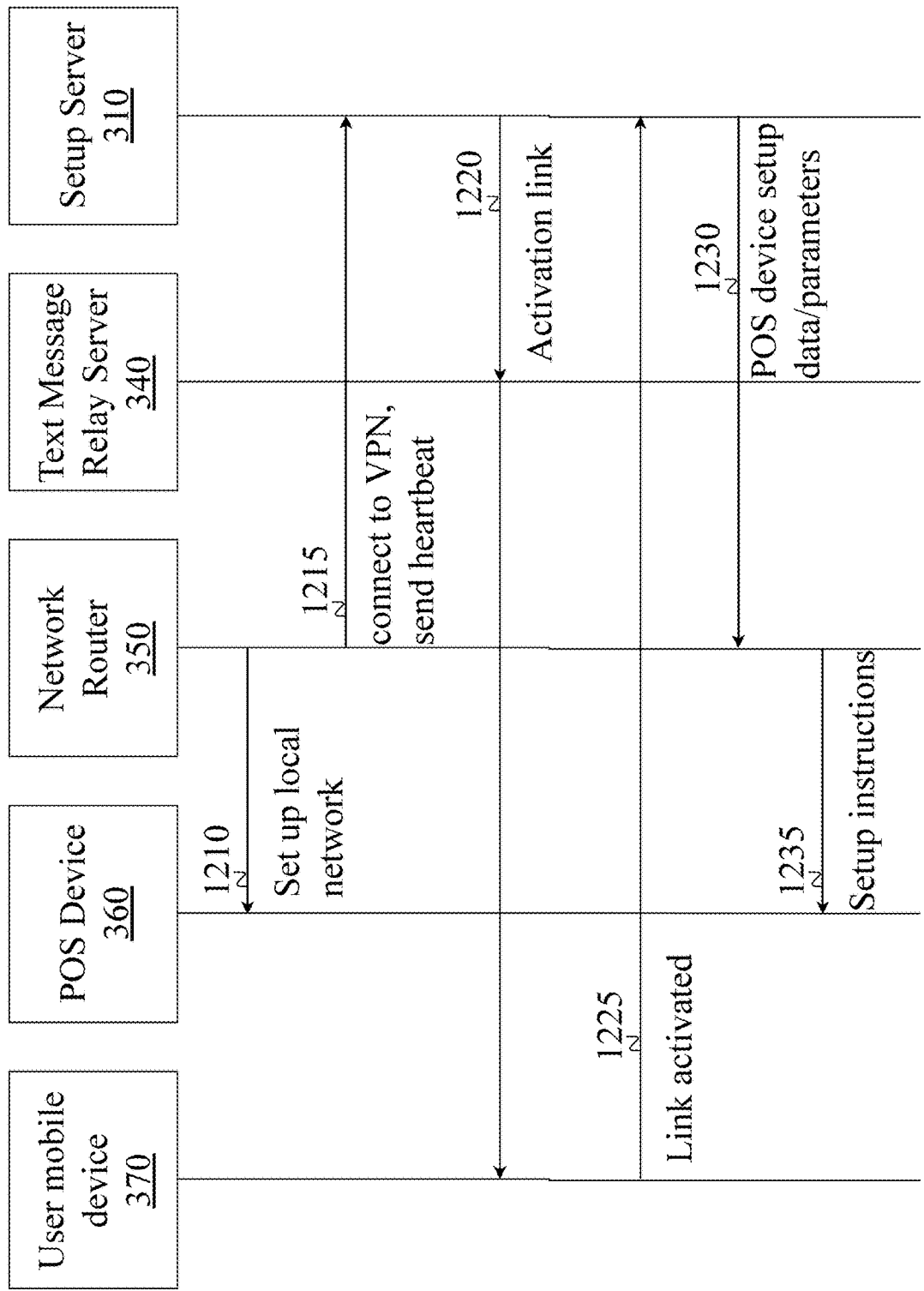
FIG. 12 is a message flow diagram illustrating messages exchanged in the function of a system for configuration of restaurant devices by remote communication with a preconfigured network router, according to an embodiment.

FIG. 12 is a message flow diagram illustrating messages exchanged in the function of a system for configuration of restaurant devices by remote communication with a preconfigured network router, according to an embodiment. Included in the system is a setup server 310, which may be a cloud service offering, a dedicated hosting solution, virtual shared server, virtual private server, or another implementation of a web server solution. Such a server may operate any one of a variety of possible operating systems, such as a LINUX™ based operating system or a WINDOWS™ based operating system. Such a server may be connected to the Internet or another network 320, or a variety of networks including Local Area Networks ("LAN"), via at least one network adapter that may operate over a physical cable connection or wirelessly such as with WIFI™. The setup server 310 may be connected to, or may operate, a database 315, which may be one of many varying database implementations, including a SQL-based database such as MYSQL™ or MICROSOFT SQL SERVER™, a NoSQL database such as MONGODB™ or DYNAMODB™, or an ORACLE™ database, or some other form of database. It may be hosted on the same hardware or virtual instance as a server, or hosted separately and provided by a service provider, such as some cloud service providers including AMAZON™ and MICROSOFT™ offer, with their services AMAZON WEB SERVICES™ and WINDOWS AZURE™ respectively. Such a database may store configuration data, user data, user location or communications data, and data regarding VPN access. A setup server 310 communicates with a user device 370 over a network 320, which may be a local area network, or a wide area network such as the Internet, capable of connecting at least two devices for communications purposes. Protocols for such communications may include TCP/IP, UDP, and may include the use of internet services and tools such as messenger programs of various social networks or communications platforms including SKYPE™, DISCORD™, FACEBOOK™, and others. A setup server 310 further communicates with a network router 350 over a VPN 330, which may be a remote access VPN, or extranet-based site-to-site VPN, operating over the Internet, and which may be either managed and operated by the setup server 310 or by a third-party VPN provider with which the setup server 310 is configured to operate with. The setup server 310 may also be connected to, and transmit data to, a text message relay server 340, such as a service provided by TWILIO™, may be a server or distributed cloud service that relays short message service ("SMS") messages sent from a non-cellular device to either a cellular or non-cellular recipient. In some alternative embodiments, the text message relay server 340 may be a server that handles and routes non-SMS text messages such as FACEBOOK MESSENGER™ messages, emails, and other forms of internet or non-SMS communications. The network router 350 communicating over a VPN with the setup server 310 may be a wireless router such as those commonly built by companies including CISCO™ or others, or a wireless access point that connects to a separate internet router, that provides access for connected wireless devices to the internet, and communicates with at least one, but potentially a plurality of, POS devices 360, which may be any device connected to or involved with the sale of a good or service for a business. Examples may include tablets held and used by wait-staff in a restaurant, computers in a restaurant kitchen that display orders to kitchen staff for production, and computers used by administrative staff or ownership for the restaurant's operations, if they are connected to the system or network that other sales-oriented and production-oriented devices are connected to. Such a connection is established with a LAN set up by the network router, or integrated with the network router, to enable it to set up and configure the devices based on data received or exchanged with the setup server 310. A customer device 370 may be a cellular device such as an IPHONE™ or ANDROID™ phone or other smartphone, a tablet such as an IPAD™ or other tablet, a personal digital assistant or non-smartphone cellular phone, or even a laptop computer or desktop computer according to some embodiments.

According to an embodiment, a user may order and install the network router 350, and receive a text message communication from one of the prior mentioned methods on their device 370 either before or after installing and turning on the network router. Upon the network router's 350 installation and activation, it will connect to a VPN 330 it is preconfigured with the credentials to access over the internet 320, and, separately, set up or integrate with an existing LAN that connects to the POS device or devices 360. The user, which may be an administrator, general manager, or other individual in the business, may interact with the text message received from the setup server 310. Upon interacting with the text message, such as clicking or tapping on a link or scanning a QR code, the setup server sends network and POS device setup instructions to the network router 350, and the POS devices are set up by the network router, allowing for up-to-date setups to be delivered to users based on the status of the setup server and database, and allowing customers to operate their own hardware configurations and physical setups without having to buy entirely new hardware, save for the network router. The POS device setup may include setting up of a Virtual Machine ("VM") for the network router 350 to interact with and configure, or the network router may configure the devices and install separate software without a VM instance running on them. A network router 350 in this context may be a complete wireless network router, or a wireless endpoint connected to a network router, or an all-in-one modem and wireless router. First, a business administrator, manager, owner, or other employee ma set up their POS devices with virtual machine software, the virtual machine software comprising at least a network adapter and ability to install and operate software when specially instructed by the network router, for purposes such as kitchen management, inventory management, order management, and other tasks that software may be designed for, to aid a business in its operation. Once the network router is unpacked, plugged in and turned on, the network router creates or joins a local network 1210, which the local POS devices will be configured to join through the use of the VM software. The network router may join a network already in existence if it is a wireless access point for another router, or may create and manage the local network itself, with the POS devices connecting to it. The network router may then connect to the Internet, and set up a VPN connection to connect with a remote setup server 1215. Such connections may take place over a variety of internet connection protocols such as TCP/IP, UDP, OpenVPN, or others, or a combination of protocols and connectivity technologies. A text message may then be sent to the user from the setup server through a text message relay server 1220, the text message including an interactable element such as a QR code or a hyperlink, interactions with the message initiating the setup server's transfer of instructions to the network router 1225. Such a sequence of operations may be, for instance, a link being transmitted to a user's phone, the user setting up the network router, and then tapping the link once the router has been set up, the network router then setting up the locally connected POS devices. The instructions to be transmitted to the network router from the setup server are queried from the setup server's connected database, the term "database" being used here to refer to any long-term data storage solution, which may be an actual database instance, multiple database instances, a cloud data storage solution, or some other data storage and reading solution. The setup server may then transmit the network router setup instructions for local POS 1230, instructions which may include which software packages to install on each device, how to configure such packages, what the relationship between the devices should be with the different software packages, their inventory management software, and more. The setup instructions received by the network router are executed and the results of the setup instructions are sent to the local POS devices hosting the VMs 1235, or, alternatively, the instructions themselves are sent to the virtual machines to be executed rather than being executed on the network router first. The virtual machines may then set up and configure themselves and install any requisite or specified software, and integrate with existing software if desired, allowing the business to now utilize fully configured VMs running on physical machines locally, without requiring the business to buy all new hardware devices to install, instead only requiring the installation and setup of a single network router or wireless access point.

Figure 13:
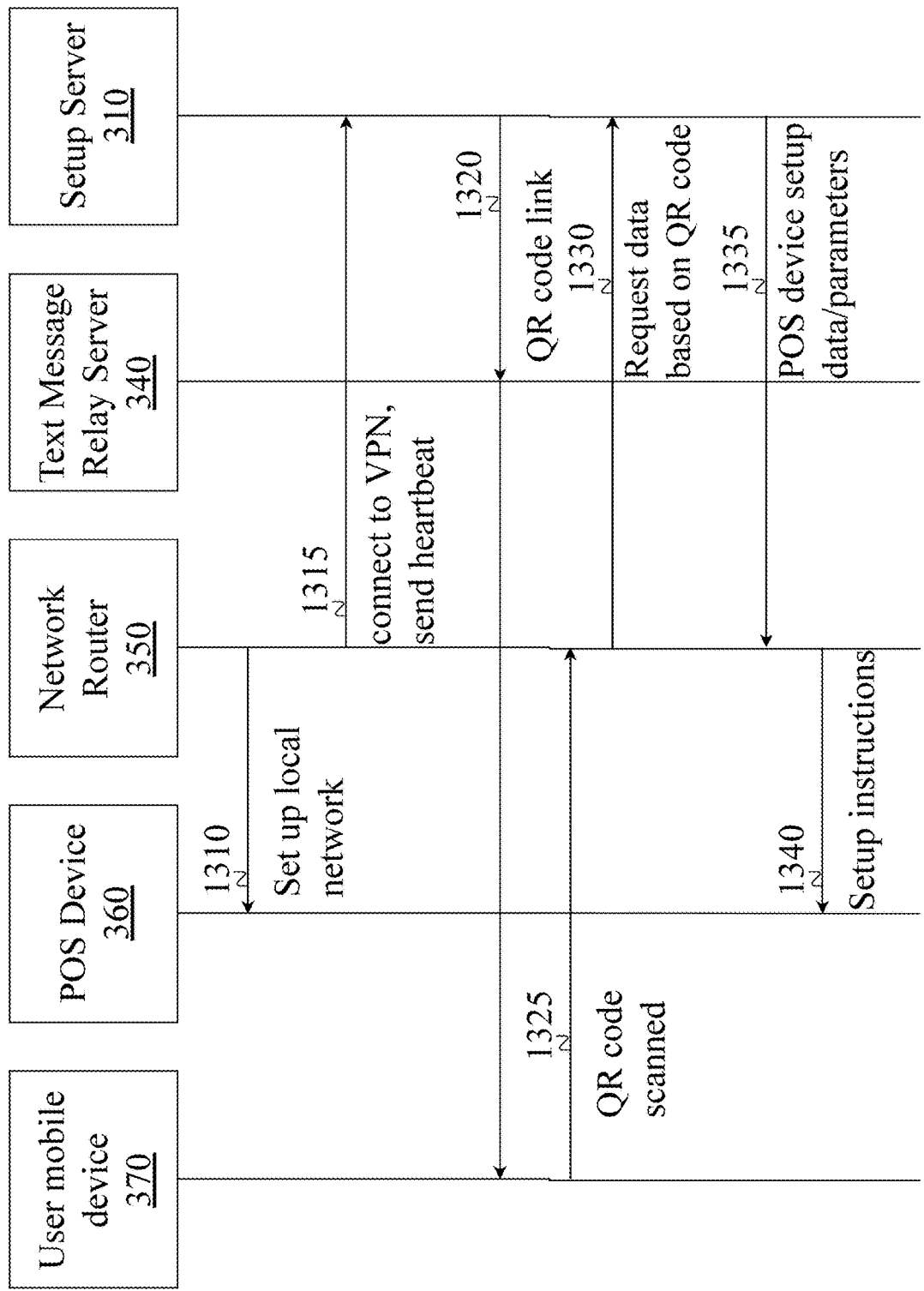
FIG. 13 is a message flow diagram illustrating messages exchanged in the function of a system for configuration of restaurant devices by remote communication with a preconfigured network router, using QR codes to scan data rather than an activation link sent to a user, according to an embodiment.

FIG. 13 is a message flow diagram illustrating messages exchanged in the function of a system for configuration of restaurant devices by remote communication with a preconfigured network router, using QR codes to scan data rather than an activation link sent to a user, according to an embodiment. Included in the system is a setup server 310, which may be a cloud service offering, a dedicated hosting solution, virtual shared server, virtual private server, or another implementation of a web server solution. Such a server may operate any one of a variety of possible operating systems, such as a LINUX™ based operating system or a WINDOWS™ based operating system. Such a server may be connected to the Internet or another network 320, or a variety of networks including Local Area Networks ("LAN"), via at least one network adapter that may operate over a physical cable connection or wirelessly such as with WIFI™. The setup server 310 may be connected to, or may operate, a database 315, which may be one of many varying database implementations, including a SQL-based database such as MYSQL™ or MICROSOFT SQL SERVER™, a NoSQL database such as MONGODB™ or DYNAMODB™, or an ORACLE™ database, or some other form of database. It may be hosted on the same hardware or virtual instance as a server, or hosted separately and provided by a service provider, such as some cloud service providers including AMAZON™ and MICROSOFT™ offer, with their services AMAZON WEB SERVICES™ and WINDOWS AZURE™ respectively. Such a database may store configuration data, user data, user location or communications data, and data regarding VPN access. A setup server 310 communicates with a user device 370 over a network 320, which may be a local area network, or a wide area network such as the Internet, capable of connecting at least two devices for communications purposes. Protocols for such communications may include TCP/IP, UDP, and may include the use of internet services and tools such as messenger programs of various social networks or communications platforms including SKYPE™, DISCORD™, FACEBOOK™, and others. A setup server 310 further communicates with a network router 350 over a VPN 330, which may be a remote access VPN, or extranet-based site-to-site VPN, operating over the Internet, and which may be either managed and operated by the setup server 310 or by a third-party VPN provider with which the setup server 310 is configured to operate with. The setup server 310 may also be connected to, and transmit data to, a text message relay server 340, such as a service provided by TWILIO™, may be a server or distributed cloud service that relays short message service ("SMS") messages sent from a non-cellular device to either a cellular or non-cellular recipient. In some alternative embodiments, the text message relay server 340 may be a server that handles and routes non-SMS text messages such as FACEBOOK MESSENGER™ messages, emails, and other forms of internet or non-SMS communications. The network router 350 communicating over a VPN with the setup server 310 may be a wireless router such as those commonly built by companies including CISCO™ or others, or a wireless access point that connects to a separate internet router, that provides access for connected wireless devices to the internet, and communicates with at least one, but potentially a plurality of, POS devices 360, which may be any device connected to or involved with the sale of a good or service for a business. Examples may include tablets held and used by wait-staff in a restaurant, computers in a restaurant kitchen that display orders to kitchen staff for production, and computers used by administrative staff or ownership for the restaurant's operations, if they are connected to the system or network that other sales-oriented and production-oriented devices are connected to. Such a connection is established with a LAN set up by the network router, or integrated with the network router, to enable it to set up and configure the devices based on data received or exchanged with the setup server 310. A customer device 370 may be a cellular device such as an IPHONE™ or ANDROID™ phone or other smartphone, a tablet such as an IPAD™ or other tablet, a personal digital assistant or non-smartphone cellular phone, or even a laptop computer or desktop computer according to some embodiments.

According to an embodiment, a user may order and install the network router 350, and receive a text message communication from one of the prior mentioned methods on their device 370 either before or after installing and turning on the network router. Upon the network router's 350 installation and activation, it will connect to a VPN 330 it is preconfigured with the credentials to access over the internet 320, and, separately, set up or integrate with an existing LAN that connects to the POS device or devices 360. The user, which may be an administrator, general manager, or other individual in the business, may interact with the text message received from the setup server 310. Upon interacting with the text message, such as clicking or tapping on a link or scanning a QR code, the setup server sends network and POS device setup instructions to the network router 350, and the POS devices are set up by the network router, allowing for up-to-date setups to be delivered to users based on the status of the setup server and database, and allowing customers to operate their own hardware configurations and physical setups without having to buy entirely new hardware, save for the network router. The POS device setup may include setting up of a Virtual Machine ("VM") for the network router 350 to interact with and configure, or the network router may configure the devices and install separate software without a VM instance running on them. A network router 350 in this context may be a complete wireless network router, or a wireless endpoint connected to a network router, or an all-in-one modem and wireless router. First, a business administrator, manager, owner, or other employee ma set up their POS devices with virtual machine software, the virtual machine software comprising at least a network adapter and ability to install and operate software when specially instructed by the network router, for purposes such as kitchen management, inventory management, order management, and other tasks that software may be designed for, to aid a business in its operation. Once the network router is unpacked, plugged in and turned on, the network router creates or joins a local network 1310, which the local POS devices will be configured to join through the use of the VM software. The network router may join a network already in existence if it is a wireless access point for another router, or may create and manage the local network itself, with the POS devices connecting to it. The network router may then connect to the Internet, and set up a VPN connection to connect with a remote setup server 1315. Such connections may take place over a variety of internet connection protocols such as TCP/IP, UDP, OpenVPN, or others, or a combination of protocols and connectivity technologies. A text message may then be sent to the user from the setup server through a text message relay server, the text message in this use case comprising at least either a QR code or a link to obtain a QR code, or some other method of transmitting QR code data to the user 1320, at which point the user may scan the QR code into the network router 1325. After scanning the QR code in, the network router 350 communicates with the setup server 310 over their VPN, to confirm the QR code scan and request setup instructions 1330, the request being potentially dynamically based on the data contained in the QR code 1325. Such a sequence of operations may be, for instance, a QR code or QR code link being transmitted to a user's phone, the user setting up the network router, and then scanning the QR code into the router once the router has been set up, the network router then setting up the locally connected POS devices. The instructions to be transmitted to the network router from the setup server are queried from the setup server's connected database, the term "database" being used here to refer to any long-term data storage solution, which may be an actual database instance, multiple database instances, a cloud data storage solution, or some other data storage and reading solution. The setup server may then transmit the network router setup instructions for local POS 1335, instructions which may include which software packages to install on each device, how to configure such packages, what the relationship between the devices should be with the different software packages, their inventory management software, and more. The setup instructions received by the network router are executed and the results of the setup instructions are sent to the local POS devices hosting the VMs 1340, or, alternatively, the instructions themselves are sent to the virtual machines to be executed rather than being executed on the network router first. The virtual machines may then set up and configure themselves and install any requisite or specified software, and integrate with existing software if desired, allowing the business to now utilize fully configured VMs running on physical machines locally, without requiring the business to buy all new hardware devices to install, instead only requiring the installation and setup of a single network router or wireless access point.

Figure 14:
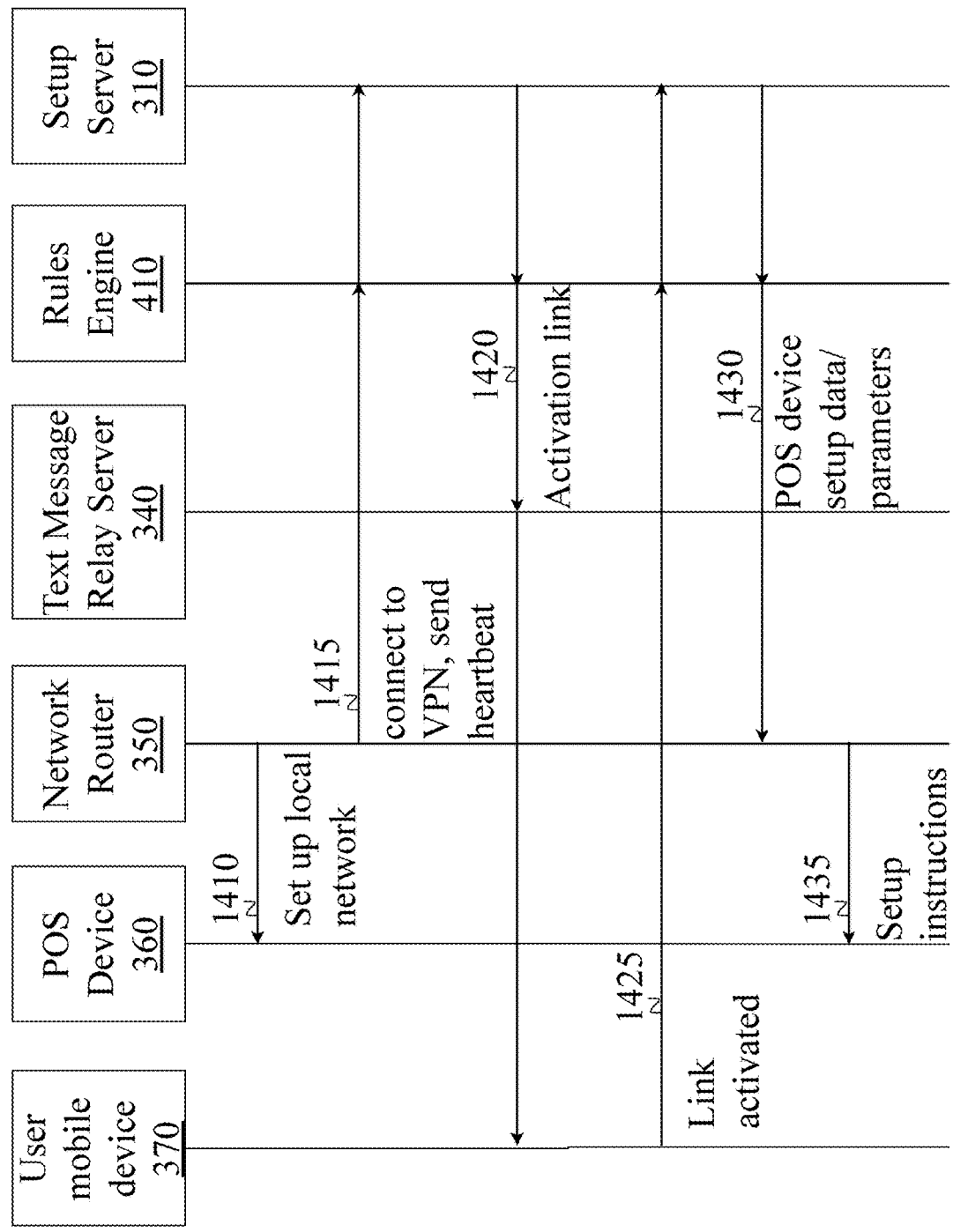
FIG. 14 is a message flow diagram illustrating messages exchanged in the function of a system for configuration of restaurant devices by remote communication with a preconfigured network router, using a rules engine, according to an embodiment.

FIG. 14 is a message flow diagram illustrating messages exchanged in the function of a system for configuration of restaurant devices by remote communication with a preconfigured network router, using a rules engine, according to an embodiment. Included in the system is a setup server 310, which may be a cloud service offering, a dedicated hosting solution, virtual shared server, virtual private server, or another implementation of a web server solution. Such a server may operate any one of a variety of possible operating systems, such as a LINUX™ based operating system or a WINDOWS™ based operating system. Such a server may be connected to the Internet or another network 320, or a variety of networks including Local Area Networks ("LAN"), via at least one network adapter that may operate over a physical cable connection or wirelessly such as with WIFI™. The setup server 310 may be connected to, or may operate, a database 315, which may be one of many varying database implementations, including a SQL-based database such as MYSQL™ or MICROSOFT SQL SERVER™, a NoSQL database such as MONGODB™ or DYNAMODB™, or an ORACLE™ database, or some other form of database. It may be hosted on the same hardware or virtual instance as a server, or hosted separately and provided by a service provider, such as some cloud service providers including AMAZON™ and MICROSOFT™ offer, with their services AMAZON WEB SERVICES™ and WINDOWS AZURE™ respectively. Such a database may store configuration data, user data, user location or communications data, and data regarding VPN access. A setup server 310 communicates with a user device 370 over a network 320, which may be a local area network, or a wide area network such as the Internet, capable of connecting at least two devices for communications purposes. Protocols for such communications may include TCP/IP, UDP, and may include the use of internet services and tools such as messenger programs of various social networks or communications platforms including SKYPE™, DISCORD™, FACEBOOK™, and others. A setup server 310 further communicates with a network router 350 over a VPN 330, which may be a remote access VPN, or extranet-based site-to-site VPN, operating over the Internet, and which may be either managed and operated by the setup server 310 or by a third-party VPN provider with which the setup server 310 is configured to operate with. The setup server 310 may also be connected to, and transmit data to, a text message relay server 340, such as a service provided by TWILIO™, may be a server or distributed cloud service that relays short message service ("SMS") messages sent from a non-cellular device to either a cellular or non-cellular recipient. In some alternative embodiments, the text message relay server 340 may be a server that handles and routes non-SMS text messages such as FACEBOOK MESSENGER™ messages, emails, and other forms of internet or non-SMS communications. The network router 350 communicating over a VPN with the setup server 310 may be a wireless router such as those commonly built by companies including CISCO™ or others, or a wireless access point that connects to a separate internet router, that provides access for connected wireless devices to the internet, and communicates with at least one, but potentially a plurality of, POS devices 360, which may be any device connected to or involved with the sale of a good or service for a business. Examples may include tablets held and used by wait-staff in a restaurant, computers in a restaurant kitchen that display orders to kitchen staff for production, and computers used by administrative staff or ownership for the restaurant's operations, if they are connected to the system or network that other sales-oriented and production-oriented devices are connected to. Such a connection is established with a LAN set up by the network router, or integrated with the network router, to enable it to set up and configure the devices based on data received or exchanged with the setup server 310. A customer device 370 may be a cellular device such as an IPHONE™ or ANDROID™ phone or other smartphone, a tablet such as an IPAD™ or other tablet, a personal digital assistant or non-smartphone cellular phone, or even a laptop computer or desktop computer according to some embodiments. A rules engine 410 may be a software package operating as part of the setup server 310, or it may be operating on a separate device connected to the setup server 310 over a local or wide area network including the Internet, communicating with and serving as an intermediary between the setup server 310 and any networks 320, 330 it may communicate through, as well as between the setup server 310 and text message relay server 340.

According to an embodiment, a user may order and install the network router 350, and receive a text message communication from one of the prior mentioned methods on their device 370 either before or after installing and turning on the network router. Upon the network router's 350 installation and activation, it will connect to a VPN 330 it is preconfigured with the credentials to access over the internet 320, and, separately, set up or integrate with an existing LAN that connects to the POS device or devices 360. The user, which may be an administrator, general manager, or other individual in the business, may interact with the text message received from the setup server 310. Upon interacting with the text message, such as clicking or tapping on a link or scanning a QR code, the setup server sends network and POS device setup instructions to the network router 350, and the POS devices are set up by the network router, allowing for up-to-date setups to be delivered to users based on the status of the setup server and database, and allowing customers to operate their own hardware configurations and physical setups without having to buy entirely new hardware, save for the network router. The POS device setup may include setting up of a Virtual Machine ("VM") for the network router 350 to interact with and configure, or the network router may configure the devices and install separate software without a VM instance running on them.

According to another aspect, a rules engine 410 may exist in the system as part of, or separate but connected to, the setup server 310, and may exist as a distinct input-output filtering device or service. In this way, the rules engine may specify what devices may connect with the setup server 310 or VPN 330, what texts may go outbound from the setup server 310, what text message interactions may be registered as valid or what response their interactions may result in, and more, adding a layer of control and abstraction from the setup server 310 itself.

First, a business administrator, manager, owner, or other employee ma set up their POS devices with virtual machine software, the virtual machine software comprising at least a network adapter and ability to install and operate software when specially instructed by the network router, for purposes such as kitchen management, inventory management, order management, and other tasks that software may be designed for, to aid a business in its operation. Once the network router is unpacked, plugged in and turned on, the network router creates or joins a local network 1410, which the local POS devices will be configured to join through the use of the VM software. The network router may join a network already in existence if it is a wireless access point for another router, or may create and manage the local network itself, with the POS devices connecting to it. The network router may then connect to the Internet, and set up a VPN connection to connect with a remote setup server, mediated by a rules engine that determines whether or not the connection may go through 1415. If the connection is denied, the network router may retry the connection, try alternative configurations for the connection if it is programmed with such, or may simply fail to connect, resulting in the user having to contact the setup server provider to inquire as to next steps. Such connections may take place over a variety of internet connection protocols such as TCP/IP, UDP, OpenVPN, or others, or a combination of protocols and connectivity technologies. A text message may then be sent to the user from the setup server through a text message relay server 1420, mediated and potentially modified by the rules engine 410, the text message including an interactable element such as a QR code or a hyperlink, interactions with the message initiating the setup server's transfer of instructions to the network router 1425, if the rules engine allows the transmission. Such a sequence of operations may be, for instance, a link being transmitted to a user's phone, the user setting up the network router, and then tapping the link once the router has been set up, the network router then setting up the locally connected POS devices. The instructions to be transmitted to the network router from the setup server are queried from the setup server's connected database, the term "database" being used here to refer to any long-term data storage solution, which may be an actual database instance, multiple database instances, a cloud data storage solution, or some other data storage and reading solution. The setup server may then transmit the network router setup instructions for local POS 1430, the transmission being moderated or altered or formatted by the rules engine 410, instructions which may include which software packages to install on each device, how to configure such packages, what the relationship between the devices should be with the different software packages, their inventory management software, and more. The setup instructions received by the network router are executed and the results of the setup instructions are sent to the local POS devices hosting the VMs 1435, or, alternatively, the instructions themselves are sent to the virtual machines to be executed rather than being executed on the network router first. The virtual machines may then set up and configure themselves and install any requisite or specified software, and integrate with existing software if desired, allowing the business to now utilize fully configured VMs running on physical machines locally, without requiring the business to buy all new hardware devices to install, instead only requiring the installation and setup of a single network router or wireless access point.

Examples of rule engine functionality may include preventing certain messages from reaching the setup server, altering their formatting or content to ensure malicious or malformed messages do not get received by the setup server, sanitizing data, and more, as well as possibly acting as a separate (or additional) firewall for the setup server.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 15:
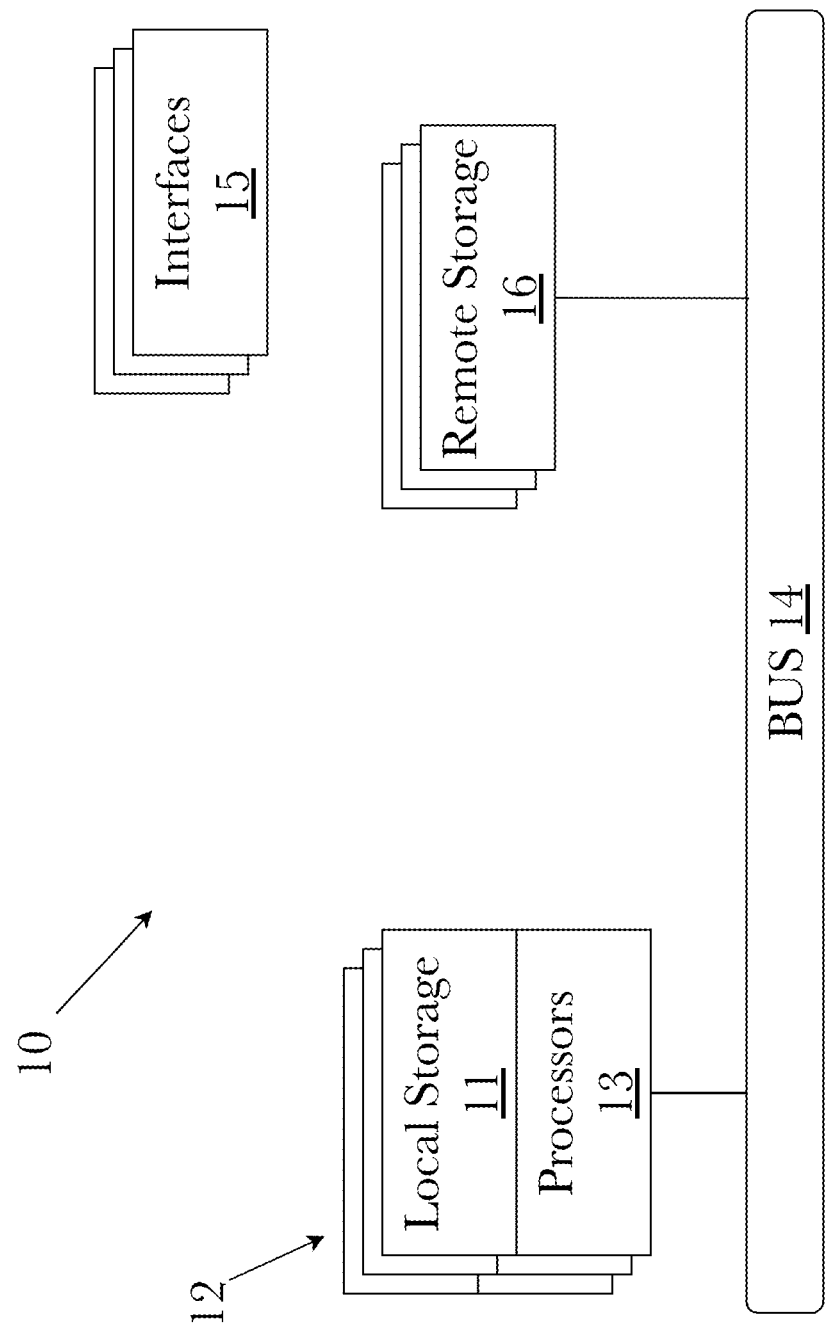
FIG. 15 is a block diagram illustrating an exemplary hardware architecture of a computing device.

Referring now to FIG. 15, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown in FIG. 15 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 16:
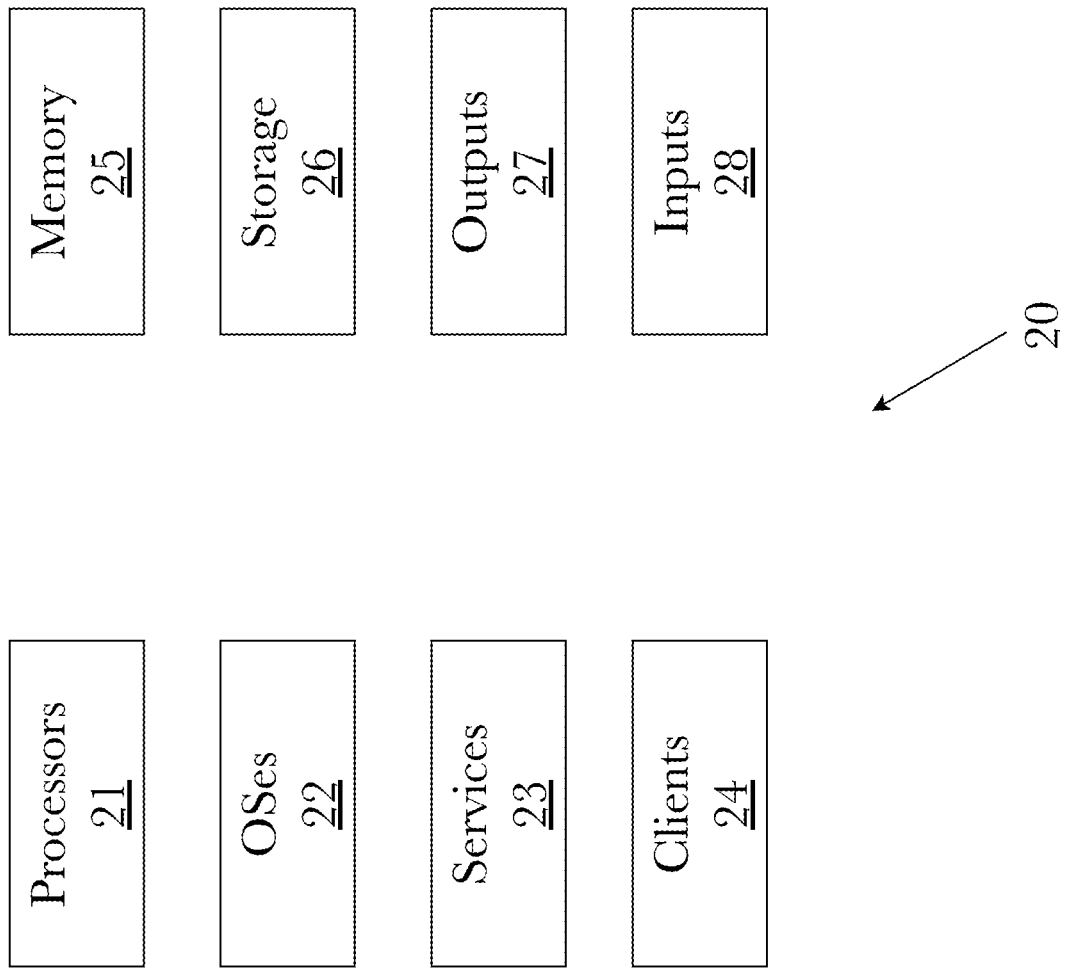
FIG. 16 is a block diagram illustrating an exemplary logical architecture for a client device.

In some aspects, systems may be implemented on a standalone computing system. Referring now to FIG. 16, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 15). Examples of storage devices 26 include flash memory, magnetic hard drive, CD-ROM, and/or the like.

Figure 17:
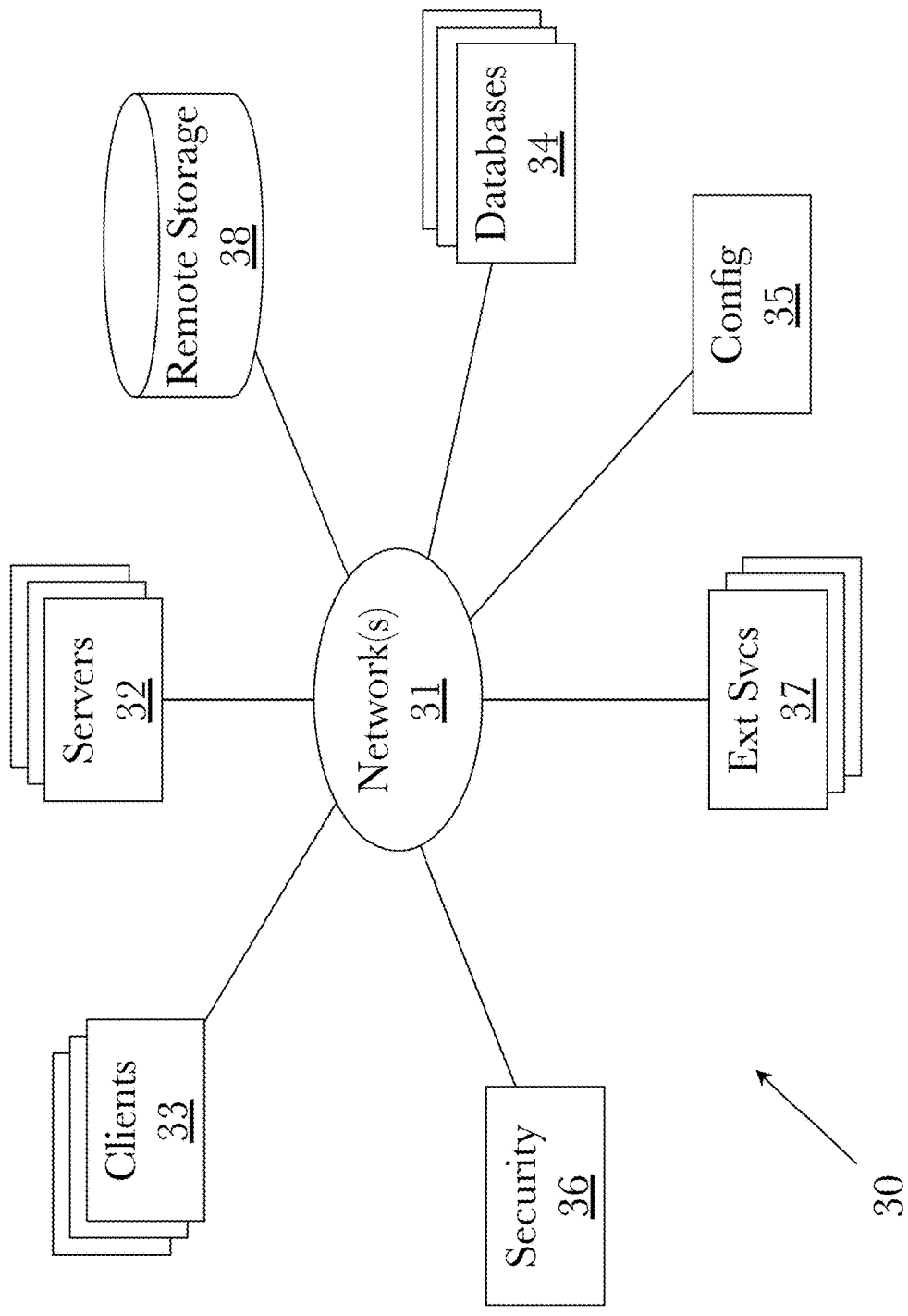
FIG. 17 is a block diagram showing an exemplary architectural arrangement of clients, servers, and external services.

In some aspects, systems may be implemented on a distributed computing network, such as one having any number of clients and/or servers. Referring now to FIG. 17, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 16. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 18:
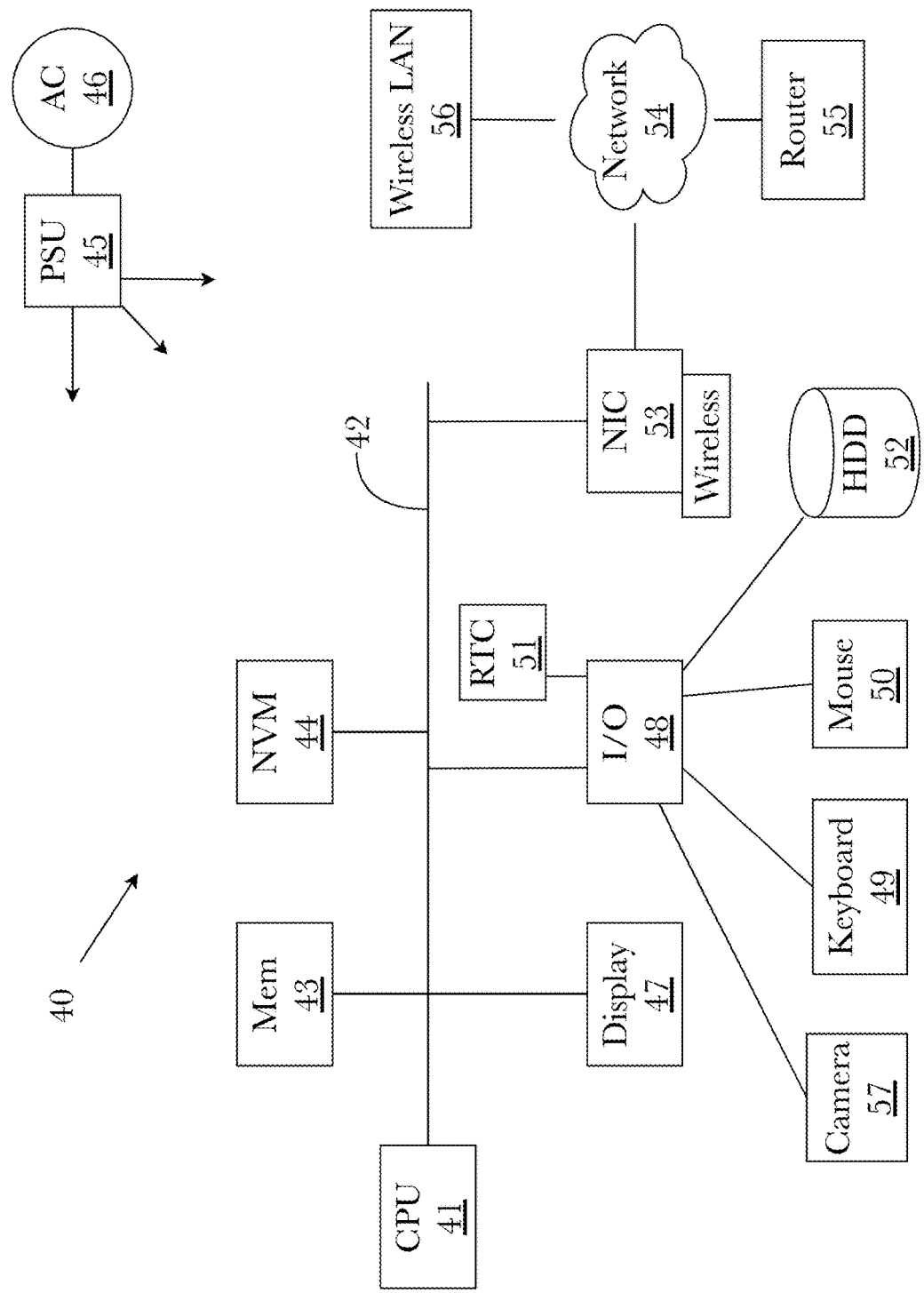
FIG. 18 is another block diagram illustrating an exemplary hardware architecture of a computing device.

FIG. 18 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for the automatic configuration of devices by remote communication with a server, comprising:

a merchant database, wherein an account for a merchant is stored, each merchant account comprises authentication credentials and contact information;

a preconfigured router;

a server comprising at least a first plurality of programming instructions stored in the at least one memory of, and operating on at least one processor of, the computer system, wherein the first plurality of programming instructions, when operating on the at least one processor, causes the computer system to:

retrieve the merchant account from the merchant database; and send the merchant account to a QR module;

a QR module, comprising a first plurality of programming instructions stored in the memory and operating on the processor, wherein the first plurality of programming instructions, when operating on the processor, causes the computer system to:

generate a QR code for the merchant comprising authentication credentials;

a messaging service, comprising a second plurality of programming instructions stored in the memory and operating on the processor, wherein the second plurality of programming instructions, when operating on the processor, causes the computer system to:

receive a notification of a successful delivery of physical devices to a merchant, wherein the notification triggers the messaging service to:

generate a message comprising the QR code; and transmit the message to the merchant using the merchant's contact information, wherein the merchant subsequently scans the QR code;

a network manager, comprising a third plurality of programming instructions stored in the memory and operating on the processor, wherein the third plurality of programming instructions, when operating on the processor, causes the computer system to:

receive the authentication credentials; and initialize a compartmentalized network between the merchant and the server through the preconfigured router; and a software manager, comprising a fourth plurality of programming instructions stored in the memory and operating on the processor, wherein the fourth plurality of programming instructions, when operating on the processor, causes the computer system to:

send new wireless operating parameters to the preconfigured router over the compartmentalized network; and send customized software packages to networked devices.

2. The system of claim 1, wherein the QR code further comprises a link to download an application.

3. The system of claim 2, wherein the application automatically connects to the preconfigured router.

4. The system of claim 1, where the wireless operating parameters include new router firmware.

5. The system of claim 1, wherein the software manager sends periodic software updates to the networked devices.

6. The system of claim 1, wherein the customized software packages are dependent on the purpose of the networked device.

7. A method for the automatic configuration of devices by remote communication with a server, comprising the steps of:

receiving a notification of a successful delivery of physical devices to a merchant;

generating a QR code from a merchant profile, the merchant profile comprising authentication credentials and contact information of the merchant;

generating a message comprising the QR code;

transmitting the message to the merchant using the merchant's contact information;

receiving the authentication credentials;

initializing a compartmentalized network between the merchant and the server;

sending new wireless operating parameters to a networked device; and sending customized software packages to a networked device.

8. The method of claim 7, wherein the QR code further comprises a link to download an application.

9. The method of claim 8, wherein the application automatically connects to the preconfigured router.

10. The method of claim 7, where the wireless operating parameters include new router firmware.

11. The method of claim 7, wherein the software manager sends periodic software updates to the networked devices.

12. The method of claim 7, wherein the customized software packages are dependent on the purpose of the networked device.

* * * * *